United States Patent
Braford

(10) Patent No.: US 8,429,992 B2
(45) Date of Patent: Apr. 30, 2013

(54) POWER FLOW CONFIGURATION FOR DUAL CLUTCH TRANSMISSION MECHANISM

(75) Inventor: Thomas E. Braford, Brighton, MI (US)

(73) Assignee: BorgWarner Inc., Auburn Hills, MI (US)

(*) Notice: Subject to any disclaimer, the term of this patent is extended or adjusted under 35 U.S.C. 154(b) by 852 days.

(21) Appl. No.: 11/816,382

(22) PCT Filed: Feb. 10, 2006

(86) PCT No.: PCT/US2006/004872
§ 371 (c)(1),
(2), (4) Date: Nov. 3, 2008

(87) PCT Pub. No.: WO2006/086704
PCT Pub. Date: Aug. 17, 2006

(65) Prior Publication Data
US 2009/0137358 A1  May 28, 2009

Related U.S. Application Data

(60) Provisional application No. 60/651,804, filed on Feb. 10, 2005, provisional application No. 60/738,935, filed on Nov. 22, 2005.

(51) Int. Cl.
*F16H 3/08* (2006.01)

(52) U.S. Cl.
USPC .............................................. 74/331; 74/339

(58) Field of Classification Search ............ 74/331, 74/333, 339, 340
See application file for complete search history.

(56) References Cited

U.S. PATENT DOCUMENTS

| 2,697,367 | A | 12/1954 | Winther |
| 4,470,326 | A * | 9/1984 | Schmidt ..................... 475/211 |
| 5,329,828 | A | 7/1994 | Hurth |
| 7,080,566 | B2 * | 7/2006 | Baldwin et al. ............... 74/331 |
| 7,107,866 | B2 * | 9/2006 | Baldwin et al. ............... 74/331 |
| 7,713,164 | B2 * | 5/2010 | Silveri et al. ..................... 477/5 |
| 2002/0189397 | A1 * | 12/2002 | Sakamoto et al. ............ 74/661 |
| 2008/0163710 | A1 | 7/2008 | Antonov |

FOREIGN PATENT DOCUMENTS

| DE | 3621545 A1 | 1/1988 |
| DE | 4005383 A1 | 8/1991 |
| DE | 4206033 A1 | 3/1993 |
| DE | 10232833 A1 | 2/2004 |

(Continued)

*Primary Examiner* — Ha D. Ho
(74) *Attorney, Agent, or Firm* — BrooksGroup

(57) ABSTRACT

A transmission mechanism with a pair of selectively engageable clutch systems has an upstream gear ratio and a downstream gear ratio that combine to provide an effective gear ratio. A different clutch drive member is associated with an input side of each of the pair of clutch systems. The clutch drive members are driven for rotation by an engine input member. The upstream gear ratio is determined by the gear ratio between the engine input member and one of the clutch drive members. Output sides of each of the clutch systems drive an associated one of a pair of non-coaxial layshafts. Pinions are located on and selectively driven by the layshafts. A countershaft is spaced from both of the layshafts, and has a plurality of gears. Each of the gears is driven for rotation by one of the pinions of the layshafts. The downstream gear ratio is determined by the gear ratio between the selected pinion and the intermeshed gear.

52 Claims, 22 Drawing Sheets

FOREIGN PATENT DOCUMENTS

| | | |
|---|---|---|
| DE | 10232838 A1 | 2/2004 |
| EP | 0 797 025 A1 | 9/1997 |
| EP | 0797025 A1 | 9/1997 |
| EP | 0 987 467 A2 | 3/2000 |
| JP | 2000266136 | 9/2000 |
| WO | WO 2004010026 | 1/2004 |

* cited by examiner

POWER FLOW CONFIGURATION FOR DUAL CLUTCH TRANSMISSION MECHANISM

This application is a U.S. national phase application filed under 35 U.S.C. §371 of International application PCT/US2006/004872, filed on Feb. 10, 2006, designating the United States, which claims the benefit of U.S. Applications No. 60/651,804, filed Feb. 10, 2005, and No. 60/738,935, filed Nov. 22, 2005, which are hereby incorporated by reference herein.

FIELD

The disclosure relates to dual-clutch transmissions and, in particular, to dual clutch transmissions with an improved configuration and to a method of power flow using dual clutch transmissions.

BACKGROUND

A typical automotive transmission utilizes a common input shaft providing drive power from an engine to a series of gears (which also may be referred to as "pinions") located on one or more drive shafts (which also may be referred to as "layshafts") that are aligned and intermeshed with corresponding gears located on a parallel output shaft (which also may be referred to as a "countershaft"). Specific combinations of corresponding pinions on the layshaft and gears on the countershaft may be selected to provide different gear ratios for transmitting torque at different, typically overlapping, rotational speed ranges.

More specifically, the combinations of corresponding pinions and gears provide gear ratios for transmitting toque and rotation from the engine to downstream components of a drive train, such as a differential system, and ultimately to wheels operably connected to the drive train. When the pinion of the layshaft drives the corresponding gear of the countershaft for rotation, the resultant gear ratio is commonly referred to by a certain gear number. For example, first gear of the transmission system can be the result of the gear ratio between a "first gear" pinion on the layshaft and an intermeshed and corresponding "first gear" gear on the countershaft. The term gear ratio is used broadly herein to encompass any reduction in torque or speed between two rotating elements. For example, the term gear ratio encompasses ratios between gears having intermeshed teeth, and ratios between sprockets rotated via a common chain.

For certain transmissions, a pair of co-axially arranged drive or layshafts is provided. Each of the layshafts selectively transmits torque to a series of pinions, typically alternating between the layshafts as the diameter of the pinions increases. The pinions located on the layshaft intermesh with the corresponding gears located on the countershaft to provide the desired gear ratios. The countershaft, in turn, transmits the torque and rotational speed to the downstream components of the drive train at the selected gear ratio. In this manner, for example, an odd layshaft transmits torque and rotation to pinions and gears that may be selected to provide first, third, and fifth gear ratios, and an even layshaft transmits torque and rotation to pinions and gears that may be selected to provide second, fourth, and sixth gear ratios. Hence, the pinions on the layshafts and gears on the output or countershaft are often referred to by their position in the relative progression of gear ratios provided by the transmission (i.e., first gear pinion and first gear; second gear pinion and second gear; etc.).

Transmissions having co-axially arranged layshafts are often referred to as dual-clutch transmissions when each of the layshafts is equipped with an independently-engageable clutch system for selectively engaging and disengaging the layshafts to supply torque and rotation through selected gear ratios to the countershaft. The desired combination of pinions and gears to provide the desired "gear," i.e., gear ratio, is selected through an automatic or manual shifting system. The clutch systems may be selectively engaged to transfer torque and rotation from the engine input shaft, through the selected clutch system and layshaft, and through the selected combination of corresponding pinions and gears to provide torque and rotational speed to the countershaft, and then to other components of the drive train, determined by the input shaft torque and speed and the selected gear ratio.

Upon selection of an intermeshed pinion and gear combination, the rotational speed of the pinion and/or gear typically must be synchronized with the rotation of its respective layshaft or countershaft. To facilitate this adjustment, for example, the countershaft often includes multiple synchronizers that can be individually activated, such as by using hydraulics, to engage a desired gear of the countershaft in driving rotation to gradually bring the gear, pinion and/or layshaft to the same rotational speed as the countershaft. The gear and countershaft are then locked to prevent further relative rotation. Thus, when a particular gear ratio is selected, the rotational speed of the countershaft is matched to the speed of the selected gear of the countershaft which is driven for rotation by the corresponding pinion located on the selected layshaft.

The resultant torque and speed of the output shaft or countershaft is determined by the torque and speed of the common input shaft, modified in the transmission by the gear ratio between the selected pinion and gear combination. For example, to select first gear, the odd layshaft clutch may be engaged to transmit torque from the input shaft to the odd layshaft. Rotation of the odd layshaft causes each of the pinions mounted thereon, such as first gear pinion, third gear pinion and fifth gear pinion, to rotate.

Rotation of the odd layshaft causes the first gear pinion, third gear pinion, and fifth gear pinion to drive each of the corresponding gears of the countershaft for rotation therewith. However, each of the corresponding gears of the countershaft is allowed to free-wheel relative to the countershaft unless engaged. When first gear is selected, the synchronizer located on the countershaft and associated with first gear is activated to engage the first gear with the countershaft for rotation therewith. The first gear pinion mounted on and driven by the odd layshaft is intermeshed with the first gear on the countershaft, and thus drives the countershaft through the first gear rotation, which in turn rotates the drive train. A similar procedure is followed for the other gears, and this sequence can be reversed to shift from a higher gear (such as second gear) to a lower gear (such as first gear).

The transmission is typically located in an engine compartment which also includes many other components, such as the engine, the radiator and coolant system, battery, etc. In most modern vehicles, the engine compartment affords little spare room or space. As a result, the design of a vehicle requires consideration of the size and geometry of each component to be installed within the engine compartment. Oftentimes, a pre-determined size and geometry of one or more of the components results in, or dictates, a particular availability of other components due to space restrictions within the engine compartment. Furthermore, the design of the engine compartment and the vehicle body are often influenced by minimal packaging requirements for the operational components. In some instances, a savings of 10% of the size and/or weight of the transmission is considered significant from a commercial standpoint.

In many dual clutch transmissions, the synchronizers are located on the countershaft, due to the arrangement of the co-axial layshafts and countershaft and the desire to minimize the length of the transmissions. For example, this arrangement can permit the pinions on the layshafts to be more closely spaced than if the synchronizers were located on the layshafts and between the pinions. However, such a transmission arrangement has disadvantages.

For example, each of the synchronizers must have a capacity sufficient to transfer torque between the countershaft and the selected gear located on the countershaft. The required torque capacity of the synchronizers is a function of the square of the differential speed (w) between the countershaft and the selected gear prior to their engagement and the rotational inertial of the gear, which in turn is a function of the diameter of the gear. The diameters of the gears also vary depending upon the desired gear ratios. For example, in first gear it often is desirable to provide to countershaft with a reduction in rotational speed and an increased torque relative to the torque and speed of the input shaft. In order to accomplish this, the first gear pinions often are of a small diameter, which is limited by the diameter of its respective layshaft, and the corresponding first gear on the countershaft is of very large diameter. The second gear pinion located on the layshaft typical is of a larger diameter than the first gear pinion, and the second gear located on the countershaft is of a smaller diameter than the first gear, and so on.

Due to the comparatively large reduction in speed and increase in torque desired for the first gear ratio, the synchronizer torque capacity for the first gear of the countershaft often must be significantly greater than the synchronizer capacities for the other gears. Because the synchronizer for first gear is mounted on the countershaft, the synchronizer must have sufficient torque capacity to compensate the additional torque load imposed by the relatively high gear ratio and rotational inertia for first gear, which may include reflected inertia from the pinion and layshaft. In a typical five speed transmission, for example, the gear ratios may be as follows: 4.12 (first gear); 2.17 (second gear); 1.52 (third gear); 1.04 (fourth gear); 0.78 (fifth gear); and 3.32 (reverse gear).

In general, the more capacity that is required of the synchronizer, the larger and more costly the synchronizer is. Therefore, in order to minimize the costs of such transmissions, a variety of different synchronizers having different capacities are used. For example, the synchronizers for first gear typically are larger and more costly than the synchronizers for the other gears, and may be of a different more complex construction, such as multi-cone synchronizers, raising additional durability and service issues.

The arrangement of the pinions and gears, in addition, limits the minimum diameters (perpendicular to the axes of the layshafts) and the minimum lengths (parallel to the axes of the layshafts) of the transmission. For example, the diameter of the first gear, typically the largest gear diameter, is often a factor that limits efforts to reduce the diameter of the overall transmission. The number of gears on the countershaft, in addition, can be a limiting factor on the minimum length of the transmission, as the gears are typically aligned in series, with a separate countershaft gear provided for each of the gears of the layshafts for the different gear ratios.

Accordingly, it is desired to provide components providing flexibility in the design, installation, and selection of transmission components installed within the engine compartment. In particular, it is desired to provide an vehicle transmission that can be configured to a selected geometry, is reduced in cost and can operate with a reduced complexity of design constrictions.

SUMMARY

A vehicle transmission mechanism and system for transmitting torque from an engine input shaft to a drive train that is more cost efficient, can be configured for greater space efficiencies, and provides for reductions in self-apply force and clutch drag. In one aspect, the system employs a combination of dual clutches driven at different gear ratios with pinions mounted and engagable with layshafts driven by the clutches to drive gears on a countershaft at further gear ratios to provide a less complex, lower cost transmission.

In such aspects, the system provides for a durable and cost effective mechanism for transferring engine torque and rotation to a drive train with the same effective gear ratios at the countershaft as conventional systems and at reduced layshaft rotational speeds, and thus reduced clutch drag and clutch self-apply pressures. Moreover, the system permits the use of pinions sized for more cost efficient and less complex synchronizers and other engagement systems, and reduced diameter countershaft gears. The space efficiencies provided by such aspects of the transmission and system permit the reduction in complexity and cost of the clutches, the use of interchangeable clutch components, and other more cost or space efficient arrangements of the clutches, layshafts, countershaft and related components such as dampers and oil pumps In one aspect, the transmission mechanism and system includes an input shaft from an engine having an engine input drive member, such as a sprocket or gear, that simultaneously drives a separate first clutch and a second clutch. Each clutch includes a drive member, such as a sprocket or gear, configured to transfer torque from the engine input to the input side of the clutch. The engine torque is transferred at a first gear ratio to the first clutch, and a different, second gear ratio to the input side of the second clutch.

In one aspect, a layshaft is provided for each clutch that is selectively engagable by the clutch to transfer the engine torque and rotation to the layshaft at the respective first or second gear ratio. The first clutch is provided with a first or odd layshaft for the odd numbered transmission gears, e.g. 1st gear, 3rd gear, and 5th gear, which is rotatable about a first layshaft axis. The second or even clutch is provided with a second layshaft for the even numbered transmission gears, e.g. 2nd gear, 4th gear, 6th gear, and reverse gear, which is rotatable about a second layshaft axis. The first layshaft axis is spaced from, and parallel to the second layshaft axis.

Each layshaft, in addition, carries a plurality of coaxially arranged pinions. A first set of pinions on the first, odd layshaft is for the odd gears, and a second set of pinions is on the second, even layshaft. The pinions are continuously intermeshed with and are positioned to drive gears mounted on a countershaft. In this aspect, the countershaft rotates about an axis parallel to and spaced from both the first layshaft axis and the second layshaft axis, and the countershaft gears are coaxially arranged on the countershaft. For each odd transmission gear, a countershaft gear is intermeshed with and driven by a corresponding pinion from the first, odd layshaft pinions. For each even transmission gear, a countershaft gear is continuously intermeshed with and is driven by a pinion from the second, even layshaft.

Each pair of countershaft gears and pinions provide a different gear ratio, which when combined with the gear ratio provided through one of clutches, supply the final, effective transmission gear ratios, i.e. the gear ratio supplied through the countershaft to the drive train for each transmission gear. In this aspect, the layshafts are independently engagable to transfer rotation and torque at different gear ratios to each set of pinions, and each pinion within each set is independently engagable with its corresponding countershaft gear at different gear ratio. Thus, in this aspect of the dual clutch transmission mechanism, the gear ratios between the layshaft pinions and the corresponding countershaft gears may be reduced relative to those used in conventional transmissions, while providing comparable final, effective gear ratios.

In another aspect, the reduction of the gear ratios supplied by the pinions and countershaft gears permit an increase in the diameter of pinions, and particularly for the low gears (i.e. $1^{st}$ gear, $2^{nd}$ gear and reverse); this permits the use of a synchronizer on the layshaft, as opposed to the countershaft. In this aspect, the each pair of pinions and countershaft gears is engaged by the engagement of the pinion with its respective layshaft. A layshaft synchronizer is mounted on the each layshaft to selectively engage one or more pinions. In some applications, the synchronizer is disposed between adjacent pinions, and is movable in one direction from a neutral unengaged position to engage one pinion, and in the opposite direction to engage the other pinion.

Each of the synchronizers include a contact portion with a first friction surface that is oriented to engage a friction surface of a receiving portion on the pinion. To synchronize the rotation of the layshaft and pinions, the synchronizer contact portion is progressively moved into frictional contact with the pinion receiving surface, transferring torque and rotation, until the rotational speed of the layshaft and pinion are essentially the same, and the pinion is locked in place. The torque capacity of the synchronizer is sufficient to compensate for gear, pinion and layshaft inertia, clutch drag and related factors.

By moving the synchronizers from the countershaft location typical of dual clutch transmission to the layshafts, the increase of the torque load on the synchronizers by a factor of the gear ratio is avoided. As a result, the torque capacity for the lower gear synchronizers can be substantially reduced relative those used in conventional dual clutch transmissions. In one aspect, a single cone synchronizer or one way clutch can be substituted more expensive and more complex multistage synchronizers, or other higher torque capacity systems used in conventional dual clutch transmissions. In one aspect using the one way clutch, a hydraulically actuated synchronizer also can be eliminated simplifying the control system.

In another aspect, the selected gear ratios between the engine input and first and second clutches reduce the rotational speed of the clutches and layshafts necessary to provide the required torque and rotation transfer to the countershaft. This speed reduction reduces the clutch drag, and drift-on or self apply speed in the clutches, which are functions of the centrifugal force exerted on the fluids used to cool and operate the clutches as a result of the clutch rotation. The reduction in self-apply force permits a reduction complexity of the balance systems offsetting the self-apply force, and the spring force required to off set the self-apply forces. As a result, the mechanism and system provides additional cost savings and operational efficiencies.

In another aspect, a vehicle transmission mechanism is provided with an engine input through an engine shaft with two sprockets providing, a separate, simultaneous sprocket and chain drive to the first, odd clutch and the second even clutch. The engine input sprockets and clutch drive sprockets each having a number of sprocket teeth to produce the first gear ratio at the first, odd clutch and a second gear ratio at the second even clutch.

In yet another aspect, the engine input drive, the first clutch drive and second clutch drive are provided with gears instead of sprockets. An idler gear is engaged with and driven by the engine input gear and the idler drives the first clutch gear and first clutch. A second idler gear is driven by the engine input gear, and drives the second clutch drive gear. The diameters of the engine input gears and clutch drive gears provide the first gear ratio with the first, odd clutch and the second gear ratio for the second, even clutch.

In another aspect, a sprocket drive between the engine input and first, odd clutch at a first upstream gear ratio, and a gear drive between the engine input and second even clutch is used to provide the second upstream gear ratio. In other aspects, combinations of upstream sprocket and gear drives are used to drive the clutches at different gear ratios, including drives where the drive gear or sprocket of the first clutch may drive the gear or sprocket of the second clutch at a second gear ratio.

In one aspect, alternative reverse gear configurations can be used that benefit from the reduction of the gear ratios used downstream of the clutches. In further aspects, the dual clutch mechanism and system disclosed herein permits very significant flexibility in the arrangement of the, engine input, clutches, layshafts and countershafts so that other components may be used with the system efficiently. In such aspects, the first and second layshaft axes may positioned equidistant from the countershaft axes. A damper may be coaxially interposed between the input shaft of the engine and the engine input member to dampen vibrations in the input shaft of the engine. A damper also may be positioned within the transmission housing supplied with transmission oil flow, i.e. a "wet" environment. A pump drive may be concentrically mounted on the input shaft of the engine to obtain efficiencies in the oil supply system.

The dual clutch mechanism and system disclosed herein further provides a method for modifying the transmission components through the selection of gear ratios upstream of the clutches and downstream of the clutches. Using the flexibility provided by this system, the cost and operational efficiencies as discussed below may be used to optimize the transmission construction and operation for specific applications. Other aspects, advantages and uses of the dual clutch mechanism and system disclosed herein are discussed below.

DETAILED DESCRIPTION

Figure 1:
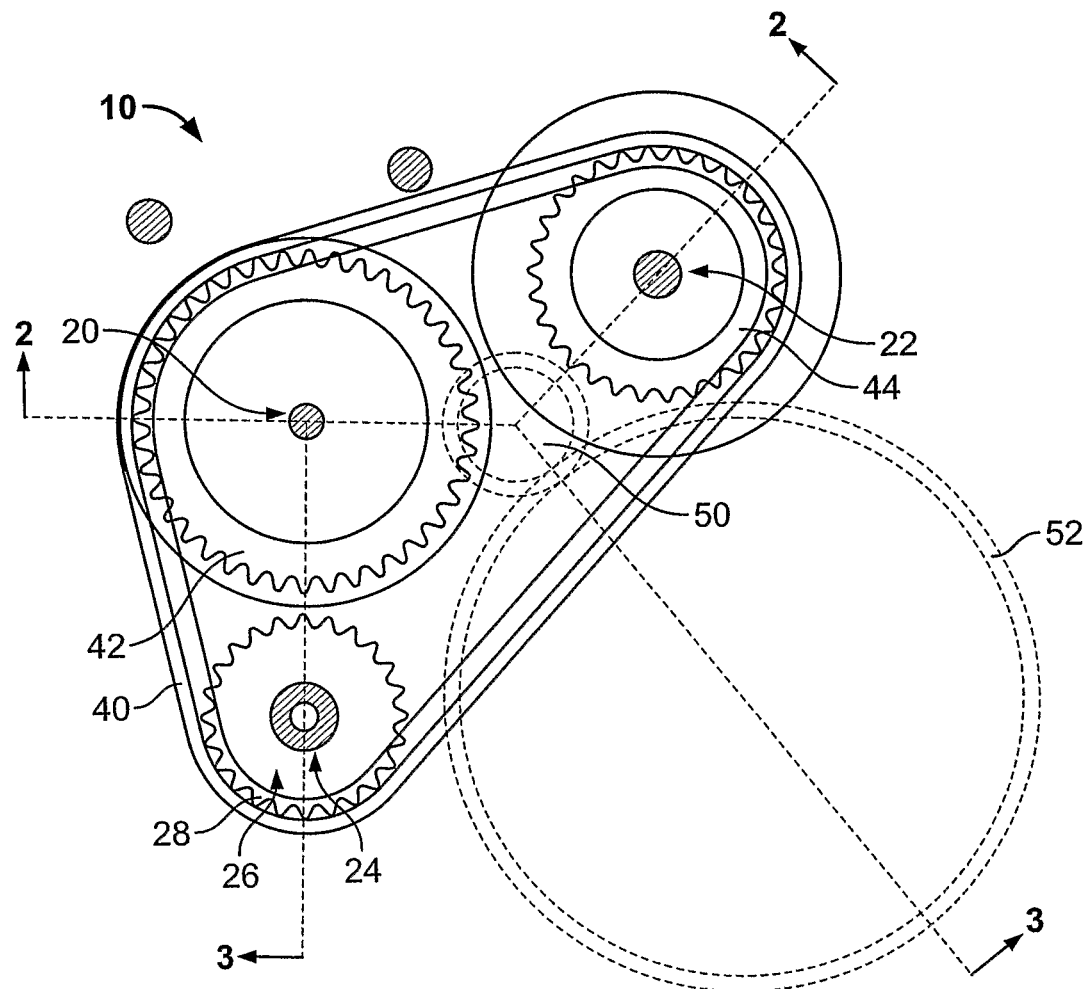
FIG. 1 is a representational front elevation view of a configuration of an input side of a six speed dual clutch transmission mechanism with an engine input sprocket mounted on an engine input shaft with a chain for driving a first clutch drive sprocket suitable for driving the pinions and gears providing odd numbered gear ratios (e.g., first, third and fifth gears) and a second clutch drive sprocket suitable for driving pinions and gears for providing even numbered gear ratios (e.g., second, fourth and sixth gears)

Referring initially to FIG. 1, an embodiment of a configuration for a dual clutch transmission mechanism 10 is depicted. As shown, a first layshaft referred to herein as the odd layshaft 20 and a second layshaft referred to herein as the even layshaft 22 are shown as parallel, non-coaxial and side-by-side shafts for receiving power transmitted from an engine (not shown) of a vehicle. The engine power in the form of variable torque generated by the engine operation over a range of engine speeds is transmitted through an engine input shaft 24 (see FIG. 3) connected to an input mechanism 26.

Figure 2:
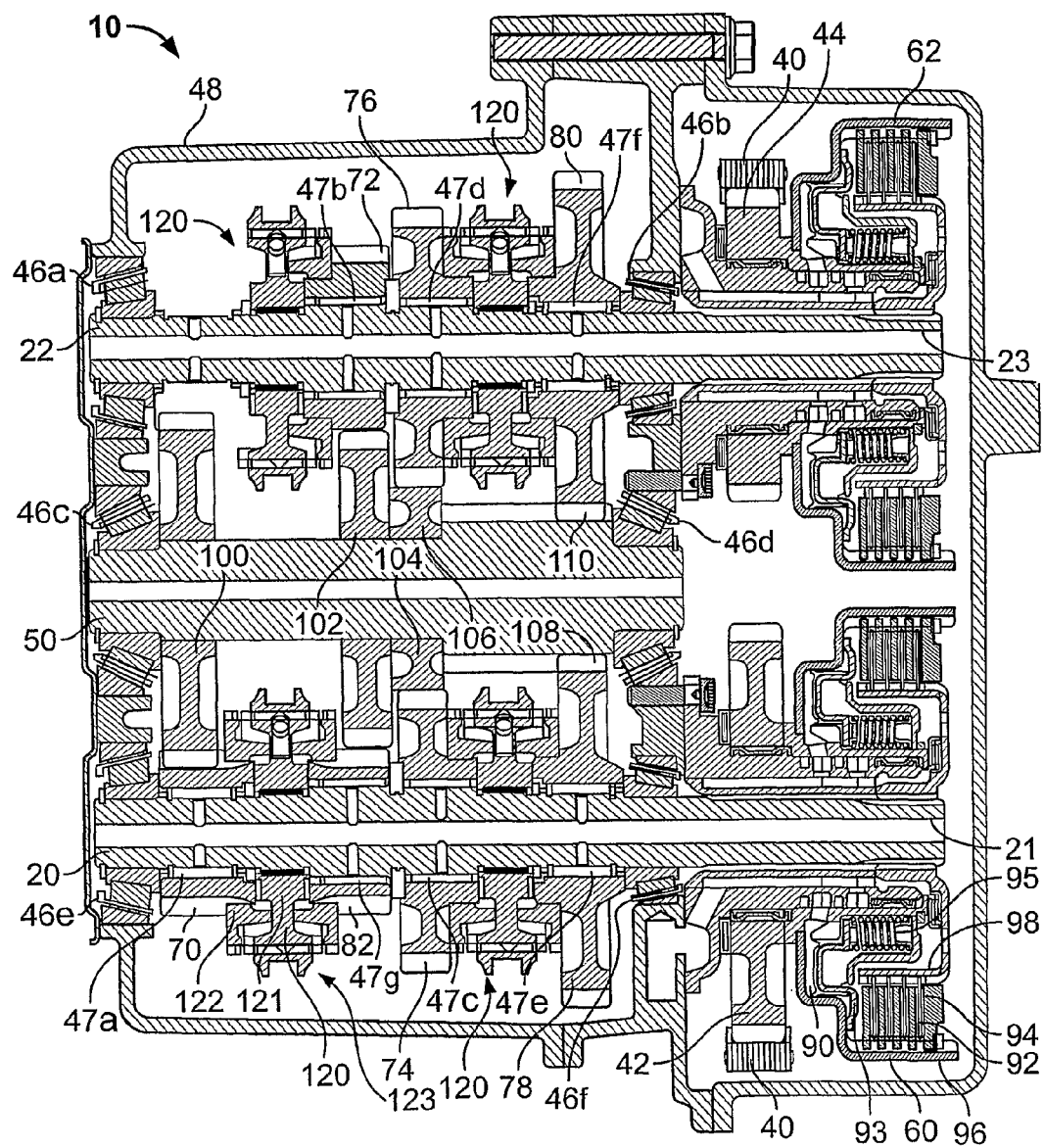
FIG. 2 is a cross-sectional view of the configuration of the dual clutch transmission mechanism of FIG. 1 taken along line 2-2 and showing a first or odd layshaft with the pinions for the odd numbered gear ratios and a second or even layshaft with the pinions for the even numbered gears, and a countershaft, a synchronizer operated first gear and a synchronizer operated reverse gear.
Figure 3:
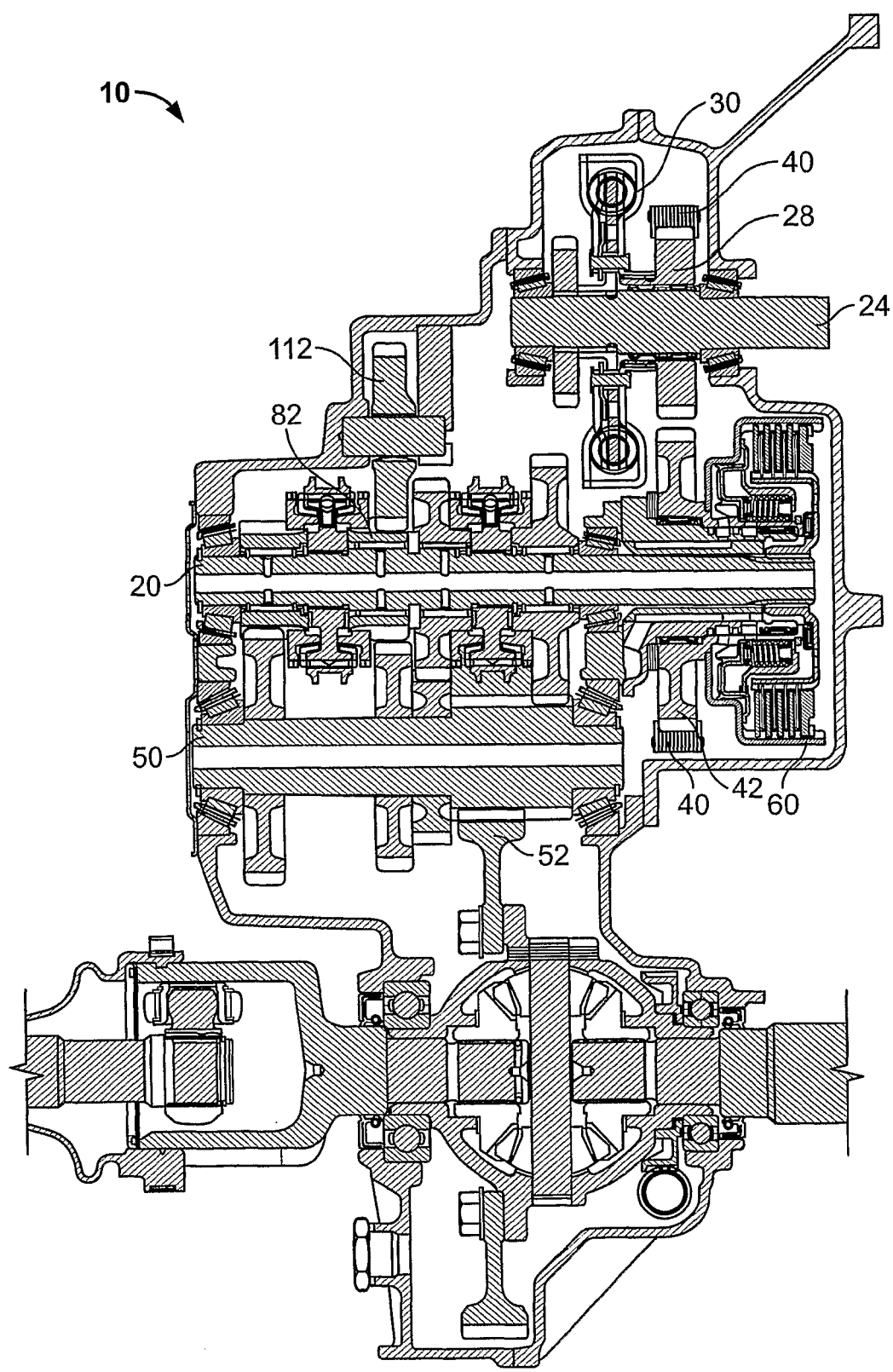
FIG. 3 is a cross-sectional view of the configuration of the dual clutch transmission mechanism of FIG. 1 taken along line 3-3 and showing the engine input shaft, the odd layshaft, the countershaft and a differential system.

In one aspect of the embodiment, the input mechanism 26 is in the form of an engine input sprocket 28 and may include a damper 30, as depicted in FIG. 3, for reducing shock and vibration resulting from erratic or variable power from the engine, discussed in greater detail below, as well as other components. In the illustrated embodiment of FIG. 1, the sprocket 28 is connected to a chain 40, such as a silent chain, and the chain 40 is connected to a first or odd clutch drive sprocket 42 and a second or even clutch drive sprocket 44, each respectively operatively connected to the odd layshaft 20 and the even layshaft 22 through clutch systems 60, 62, as illustrated in FIG. 2. In other embodiments, a gear system, a combination of a gear system and a chain system, a belt, or other power transmission systems may be used to drive the odd clutch drive sprocket 42 and the even clutch drive sprocket 44 via the engine input sprocket 28 in order to use the engine input shaft 24 to drive each of the odd and even layshafts 20, 22, typically through the clutch systems 60, 62, examples of which input mechanisms 26 are described in detail below and illustrated in FIGS. 4-12.

Referring to FIGS. 1 and 2, an output or countershaft 50 is positioned for communicating with each of the odd and even layshafts 20, 22 via a series of pinions located on the layshafts 20, 22 and gears located on the countershaft 50 for transmitting torque and rotational velocity through the drive or power train. Depending upon which of the clutch systems 60, 62 is engaged to transmit torque from the respective odd clutch drive sprocket 42 or even clutch drive sprocket 44, the countershaft 50 may receive power from one or the other of the layshafts 20, 22. In turn, the countershaft 50 is configured to drive downstream components of the power train to transmit torque to the wheels of the vehicle to drive the vehicle.

More specifically, in this aspect, a final drive gear 52, as illustrated in FIG. 3, is driven for rotation by the countershaft 50. The final drive gear 52 transmits torque to the downstream components of the drive train, such as a transaxle or a differential. In this aspect, the positioning of the countershaft 50 parallel to and spaced from both of the odd layshaft 20 and the even layshaft 22 advantageously reduces the minimum axial length of the transmission 10 while permitting the sizing, such as the mean diameter, of the countershaft 50 to provide sufficient capacity to handle the torque transmitted therethrough. Other alternative arrangements also may be used where desired, and can be selected depending in part upon the design constrictions of the compartment of the vehicle where the transmission mechanism 10 is to be located.

In the aspect of the transmission mechanism 10 illustrated in FIGS. 1-3, the axes of rotation of the layshafts 20, 22 are generally equidistant from the axis of rotation of the countershaft 50. In other arrangements the distances between the countershaft axis and axes of the layshafts may be modified for particular engine, power train, and/or engine compartment needs.

Referring now to FIG. 2, the odd and even layshafts 20, 22 are depicted. As can be seen, each layshaft 20, 22 is associated with its respective clutch systems 60, 62. The odd clutch system 60 is associated with the odd layshaft 20 and the even clutch system 62 is associated with the even layshaft 22. The control system (not shown) of transmission mechanism 10 allows selective actuation or engagement of the clutch systems 60, 62 to drive the odd and even shafts 20, 22 for rotation via the engine, and in particular via the engine input shaft 24 and the input mechanism 26.

On the upstream side of the clutches 60, 62, the odd clutch system 60 receives power from the engine through the odd clutch drive sprocket 42 with a predetermined ratio between the odd clutch drive sprocket 42 and the engine input sprocket 28, while the even clutch system 62 receives power from the engine through the even clutch drive sprocket 44 with a predetermined ratio between the even clutch drive sprocket 44 and the engine input sprocket 28. The odd clutch drive sprocket 42 and the even clutch drive sprocket 44 have different numbers of teeth and/or different diameters and/or chain pitch radii. Thus, although both the odd clutch drive sprocket 42 and even clutch drive sprocket 44 are driven for rotation by the common engine input sprocket 28, the gear ratio between the engine input sprocket 28 and the odd clutch drive sprocket 42 is different than the gear ratio between the engine input sprocket 28 and the even clutch drive sprocket 44. This results in the two clutch systems 60, 62 receiving different torques and rotational speeds on their input sides.

Turning now to the downstream side of the clutch systems 60, 62, each layshaft 20, 22 has a set of pinions intermeshed with corresponding gears on the output or countershaft 50. There is a gear ratio between each of the pinions of the layshafts 20, 22 and the corresponding gear of the countershaft 50. The pinions and corresponding gears may be sequentially utilized according to their gear ratios to contribute to an effective gear ratio between the engine input shaft 24 and the countershaft 50, which in turn drives the final drive gear 52. The effective gear ratio is the product of the upstream gear ratio, i.e., the ratio between the engine input sprocket 28 and the selected odd or even clutch drive sprocket 42, 44, and the downstream gear ratio, i.e., the ratio between the selected pinion of a selected one of the odd or even layshafts 20, 22 and the corresponding gear of the countershaft 50. The rotational speed, which is inversely related to torque, of the countershaft 50 is thus determined by the effective gear ratio.

On the downstream side of the clutch systems 60, 62, a first gear pinion 70, third gear pinion 74, and fifth gear pinion 78, as well as a reverse gear pinion 82 are located on the odd layshaft 20. A second gear pinion 72, fourth gear pinion 76, and sixth gear pinion 80 are located on the even layshaft 22. The first through sixth gear pinions 70, 72, 74, 76, 78, 80 are arranged on the layshafts 20, 22 in generally alternating fashion so that the transmission 10 can shift the rotational torque and velocity from one selected and engaged set of gear pinions 70, 72, 74, 76, 78 and 80 of the layshafts 20, 22 and corresponding gears of the countershaft 50 to the next (either higher or lower gear ratios) by alternating the selection of gears on the layshafts 20, 22 and the engagement of the odd and even clutch systems 60, 62 driving the respective odd layshaft 20 and even layshaft 22 for rotation. Because the gear ratio desired for reverse gear is typically greater than the ratio for second gear and less than the ratio for first gear, both the first gear pinion 70 and reverse gear pinion 82 are located on the same layshaft, the odd layshaft 20, in this particular example.

Each pinion 70, 72, 74, 76, 78, 80 and 82 of the layshafts 20, 22 is both coaxial with and is generally permitted to rotate freely around its respective layshaft 20, 22. To engage the pinion with its layshaft, synchronizers 120 (commonly known simply as a synchro) engage the pinions to match the speed of the layshaft 20, 22 with the speed of the selected pinion or to match the speed of the selected pinion with the speed of the respective layshaft 20, 22.

Each of the synchronizers 120, such as illustrated in FIG. 2, may have a spline portion 121 with an inner bore located around the layshaft, either the odd layshaft 20 or the even layshaft 22. The inner bore of the synchronizer has internal splines that cooperate with external splines located on the layshaft 20, 22 and aligned with the inner bore of the synchronizer 120. The synchronizer 120 may shift along its layshaft 20, 22 with the splines of the inner bore of the synchronizer 120 remaining in engagement with the external splines of the layshaft 20, 22. Accordingly, the spline portion 121 of the synchronizer 120 rotates with the layshaft 20, 22.

The synchronizer 120 further has a friction portion 122 that is engageable and disengageable with the one or more gear pinions 70, 72, 74, 76, 78, 80 and 82 with which it is associated. For instance, a first synchronizer 123 is provided on the odd layshaft 20 and is associated with both the first gear pinion 70 and the reverse gear pinion 82. When the transmission mechanism 10 shifts to the first gear ratio, the synchronizer 123 is moved toward the first gear pinion 70 so that the friction portion 122 engages with a corresponding portion of the first gear pinion 70. In doing so, the first gear pinion 70 is accelerated up to the speed of the odd layshaft 20 while being able to slip if necessary to prevent impulse shocks. That is, the first gear pinion 70 accelerates up to the rotational velocity of the odd layshaft 20 without locking the transmission without a signification jolt to the transmission mechanism 10 and thus the vehicle.

Once the rotational velocity of the first gear pinion 70 has been accelerated to match that of the odd layshaft 20 (or conversely, the rotational velocity of the odd layshaft 20 to that of the first gear pinion 70), a collar 121 of the synchronizer 123 (commonly known as a dog collar) shifts into engagement with the first gear pinion 70. The collar 121 also rotates relative to the odd layshaft 20. The collar 121 includes teeth (commonly known as dog teeth) (not shown) that are received within corresponding indentations of the first gear pinion 70 so that the first gear pinion 70 and the odd layshaft 20 rotate at the same rotational velocity.

By way of example, synchronizers 120 are provided on the odd and even layshafts 20, 22 for each of the first, second, third, fourth, fifth, sixth and reverse gear pinions 70, 72, 74, 76, 78, 80, and 82. Other examples of arrangements of synchronizers 120 are set forth in the discussion of FIGS. 14-22. As noted above, the first synchronizer 123 is located on the odd layshaft 20 for engaging the first and reverse gear pinions 70, 82 with the odd layshaft 20 for driving rotation therewith. The first synchronizer 123 shifts between the first and reverse gears pinions 70, 82 for gear ratio selection and includes one of the respective friction portions 122 for each of the first and reverse gear pinions 70, 82. Each of the friction portions 122 of the first synchronizer 123 is in the form of a cup. More specifically, the first synchronizer 120 is preferably a single cone synchronizer.

In prior transmission systems, such as those using co-axially arranged odd and even layshafts, the layshaft or shafts communicates with one or more output or countershafts comparable to the single countershaft 50 of the transmission mechanism 10 described herein. In such prior transmission systems, the synchronizers were typically provided on the countershafts, particularly for the first gear pinion and the corresponding gear of the countershaft. The diameter of the layshaft pinion for first gear was necessarily small relative to the diameter to the countershaft gear to provide the desired first gear (high torque) ratio. In some instances, the first gear pinion was machined into the layshaft in order to minimize its diameter. Thus, there was insufficient operating space on the layshaft for a synchronizer of any type, or, a synchronizer on the layshaft was inappropriate where the first gear pinion was machined in the layshaft.

As mentioned above, accelerating and decelerating such countershafts and countershaft gears to match the rotational velocity of the pinions and layshaft in such prior transmission systems required synchronizers with significantly greater torque capacities than the arrangement of the present embodiment of the transmission mechanism 10 utilizing synchronizers 120 on the layshafts 20, 22, such as the first synchronizer 123, for example, on the odd layshaft 20. In a typical prior transmission system, the synchronizers for the first gear, second gear, third gear and reverse gear are typically located on the countershaft. However, as previously mentioned, the gears, and in particular the gears for the higher gear ratios, such as the first and reverse gear ratios, can have significantly larger diameters than their corresponding gear pinions located on the layshafts. The larger diameters of the lower gears located on the countershaft results in an increase in the rotational inertia of the lower gears, and thus an increased the amount of torque capacity required to synchronize the lower gears with the countershaft.

More specifically, the torque capacity required of a synchronizer is a function of the differential speed between the two gears being synchronized and the rotational inertia of the gears. For example, when a first gear is selected using a gear and an associated synchronizer mounted on an output or countershaft of a prior transmission system, the synchronizer is used to engage the appropriate gear on the countershaft, which is intermeshed with the corresponding gear pinion located on the drive or layshaft. To accelerate (or decelerate) the rotation of the layshaft, the torque and rotation imparted by the synchronizer must be transmitted through the selected gear of the countershaft and the corresponding and intermeshing gear pinion of the layshaft. During this process, the rotational inertia from the layshaft is reflected back to the synchronizer on the countershaft and can be increased by the square of the gear ratio between the selected gear of the countershaft and the corresponding and intermeshing gear pinion of the layshaft.

Thus, for example, where the ratio between the first gear pinion on the layshaft and the corresponding gear on the countershaft is 1:4, mounting the synchronizer on the countershaft, as can be typical in prior transmission systems, would require a torque capacity 16 times greater than the torque capacity required of a synchronizer 120 located on the odd layshaft 20 for engaging the first gear pinion 70 with the odd layshaft 22 in the configuration of the transmission mechanism 10 disclosed herein and illustrated in FIGS. 1-3.

One approach to accommodate the high torque demands of other prior transmission systems were to utilize multipost, relatively complex device for engaging the gears with the countershaft or more complicated synchronizers having multi-cone friction portions, such as a triple-cone synchronizer, for the first, reverse and other relatively high ratio gears. These multi-cone synchronizers require a series of nested cones with friction surfaces that interact to progressively transfer torque to a gear or pinion through the interaction between the cones and the countershaft or layshaft. They require additional, more complex central systems to ensure their proper operation. Thus, multi-cone synchronizers and other systems to provide such increased torque capacities are typically more expensive and larger in size than single-cone synchronizers which often have reduced torque capacities.

In this aspect of the transmission mechanism 10 disclosed herein and illustrated in FIGS. 1-3, such multi-cone synchronizers or more complex high torque capacity systems are not necessary in part because the synchronizers 120 are mounted on the layshafts. In the described embodiments of the dual clutch transmission mechanism 10, the use of the combined gear ratios both upstream of the clutch systems 60, 62 and downstream of the clutch systems 60, 62 permits the use of synchronizers 120 mounted on the layshafts, i.e., the odd layshaft 20 and the even layshaft 22. This reduces the torque capacity requirements for the synchronizers 120 as they are not required to overcome the above mentioned reflected torque, as if located on the countershaft 50. Thus, smaller and simpler synchronizers, such as single cone synchronizers 120, can be utilized. Thus, the required torque capacity of the synchronizers 120 is reduced, the cost and size of the system can be reduced.

Another advantage of having the synchronizers 120 mounted on the odd layshaft 20 and the even layshaft 22, as opposed to on the countershaft 50, as can be typical in prior transmission systems, is that each of the synchronizers 120 can be the same or have nearly the same operating parameters, such as torque capacity. In this aspect, the synchronizers 120 are all mounted on the odd layshaft 20 and the even layshaft 22, as opposed to on the countershaft 50, to reduce the torque capacity required for all of the synchronizers 120.

In another aspect, mounting the synchronizers 120 on the odd layshaft 20 and the even layshaft 22, as opposed to on the output or countershaft 50 can advantageously provide a reduction of the drag torque that the synchronizer 120 must to overcome to accelerate the rotation of the layshafts 20, 22. For example, where the synchronizers 120 of the transmission mechanism 10, depicted in FIGS. 1-3, are mounted on the odd layshaft 20 and the even layshaft 22, the drag torque that must be overcome is generally that of the components of the respective layshaft 20, 22. However, where a synchronizer is disposed on a countershaft, as can be typical in prior transmission systems, the drag torque that the synchronizer must overcome is multiplied by the gear ratio. For example, where the ratio between the first gear pinion on the layshaft and the corresponding gear on the countershaft is 1:4, mounting the synchronizer on the countershaft, as opposed to the layshaft 20 or 22 as in the transmission mechanism 10 disclosed herein, can increase the torque drag that the synchronizer must overcome by about four times.

Indeed, because the gear ratios between the gear pinions 70, 72, 74, 76, 78, 80 and 82 of the layshafts 20, 22 and the corresponding gears 100, 102, 104, 106, 108 and 110 of the countershaft 50 are closer together in this aspect than the gear ratios typically required between similar components of prior transmission systems, the synchronizers 120 can all be of the same type and have the same torque capacities. Having such common synchronizers 120 can advantageously reduce the costs of the transmission mechanism 10 and increase efficiencies in the assembly of the transmission. Cost reductions can be achieved due to the elimination of the requirement of different types of synchronizers having different torque capacities, and the associated costs with increasing the complexity of assembly and control systems, and stocking of different types of synchronizers.

In such applications, the center distance between the layshafts 20, 22 and the countershaft 50 may be increased if necessary to provide sufficient space for larger diameter gear pinions, as well as space for the bearing between the pinion and the layshaft. In many configurations, however, such an increase is not necessary as the reduction in diameter of the first gear 100 located on the countershaft 50 (or other lower gears) will offset the increased diameter of the first gear pinion 70 (or other lower gears pinions).

In yet another aspect, having differing gear ratios on the input or upstream sides of each of the odd and even clutch systems 60, 62 permits reduction of the range of the rotational speeds required of the odd and even clutch systems 60, 62 relative to the speed of the engine input shaft 26. In this aspect, the input sides of the odd and even clutch systems 60, 62 having the odd drive sprocket 42 and the even drive sprocket 44, respectively, are driven at a speed that is reduced by the gear ratio between the input sprocket 28 and respective odd drive sprocket 42 and even drive sprocket 44. The result is that the input sides of the clutch systems 60, 62, and thus the clutch systems 60, 62 and the associated odd and even layshafts 20, 22, rotate at reduced speeds as compared to prior transmission systems lacking the above-discussed differing upstream gear ratios, while the effective gear ratios between the input shaft 24 and countershaft 50 are maintained at the same levels.

In this aspect, the construction of the clutch systems 60, 62 also is simplified, in that the odd clutch system 60 and even clutch system 62 are of very similar, if not the same, size and capacity and use interchangeable components. The components of the odd and even clutch systems 60, 62 will be described with respect to the odd clutch system 60, as depicted in FIG. 2, with the understanding that similar or the same components are present in the even clutch system 62. The odd clutch system 60 includes a plurality of input side clutch plates 92 that are disposed in an alternating relation with a plurality of output side clutch plates 94. The input side clutch plates 92 are mounted on an input side clutch plate carrier 96 that is operably connected to be driven for rotation by the odd input sprocket 42. The output side clutch plates 94 are mounted on an output side clutch plate carrier 98 that is operable connected to drive the odd layshaft 20 for rotation.

When it is desired to transmit torque from the odd drive sprocket 42 to the odd layshaft 20, pressurized hydraulic fluid is directed into an apply chamber 90 of the odd clutch system 62 via a hydraulic control system (not shown), as is typical for such clutch system designs. The apply chamber 90 typically contains some hydraulic fluid. When the pressurized, additional hydraulic fluid fills the apply chamber 90 with a sufficient pressure to urge the apply piston 93 against one of the input side clutch plates 92 or output side clutch plates 94, frictionally compressing the alternating clutch plates 92 and 94 are frictionally compressed together so that the input side clutch plates 92 drive the output side clutch plates 94 for rotation therewith.

In this manner, when the odd clutch system 60 is engaged, torque is transmitted from the odd drive sprocket 42, to the input side clutch plate carrier 96 and the input side clutch plates 92 mounted thereon, to the alternating, frictionally engaged output side clutch plates 94 and the output side clutch plate carrier 98 upon which they are mounted, and finally to the odd layshaft 20 to which the output side clutch plate carrier 98 is connected.

In order to prevent the apply piston 93 from prematurely shifting to engage the input side clutch plates 92 with the output side clutch plates 94, a balance spring 95 is positioned on an opposite side of the apply piston 93 relative to the apply chamber 90. Due to rotation of the odd clutch 60 in operation, the pressure of the hydraulic fluid typically in the apply chamber 90 increases due to centrifugal force as the speed of rotation of the odd clutch system 60 increases. The effect of the centrifugal force on the hydraulic fluid typically present in the apply chamber 90 is counteracted by the force exerted on the opposite side of the apply piston 93 by the balance spring 95, which is sized to exert a biasing force on the apply piston 93 sufficient to prevent the apply piston 93 from prematurely shifting both at low rotational speeds and increased rotational speeds of the odd clutch system 60. Thus, to shift the apply piston 93 to engage the input side clutch plates 92 with the output side clutch plates 94, the fluid pressure in the apply chamber 90 must overcome the biasing force of the balance spring 95 disposed on the opposite side of the apply piston 93.

In one aspect of the transmission mechanism 10 disclosed herein, the reduced rotational speed of the clutch systems 60, 62 permits a reduction of the hydraulic fluid pressure requirements necessary to shift each of the apply pistons 93 to engage the input side clutch plates 92 with the output side clutch plates 94 in order to permit the selected odd and even clutch system 60, 62 to transmit torque from the respective odd drive sprocket 42 or even drive sprocket 44 to the corresponding odd or even layshaft 20, 22. This is because lower rotational speeds of the clutch systems 60, 62 of the present transmission mechanism 10 results in a decrease in the self-apply pressure of the clutch system 60, 62 due to the reduced centrifugal force on the fluid in the apply chamber 90.

The centrifugal force acting on the apply chamber 90 is a function of the square of the rotational speed of the clutch system 60, 62. Therefore, the lower the rotational speed of the clutch system 60, 62 in the presently disclosed transmission mechanism 10 results in a very significant reduction in the maximum self-apply pressure in the apply chamber 90. This in turn results in proportional reduction in biasing force of the spring 95 that is selected to counteract the self-apply pressure. Accordingly, the hydraulic fluid pressure required in the apply chamber 90 to shift the apply piston 93 to engage the input side clutch plates 92 with the output side clutch plates 94 is significantly reduced, particularly at lower rotational speeds.

There are several advantages to having a reduced self-apply pressure and corresponding reduced fluid pressure required to shift the apply piston 93 to engage the clutch system 60, 62. One such benefit is that a lighter spring 95 or a spring 95 having a lower spring constant can be utilized, which can reduce the cost of the transmission. Another advantage is that the maximum hydraulic fluid pressure required to be provided by the hydraulic fluid supply and control systems (not shown) is reduced, which can both simplify and reduce the costs of the hydraulic fluid supply and control systems.

Yet another advantage is that simplified, i.e., having fewer components, and less costly clutch systems 60, 62 can be utilized. For example, in certain prior transmission systems, a balance chamber, which often is the same chamber containing a balance spring, is provided with a separate supply of hydraulic fluid from the supply provided to the apply chamber. The balance chamber is configured such that, as the fluid pressure in the apply chamber increases as a result of the centrifugal force during the rotation of the clutch system, the fluid in the balance chamber undergoes a comparable increase in pressure such that the fluid acting on the apply side of the apply piston is generally balanced by the fluid acting of the balance side of the apply piston along with the spring force of the balance spring. However, having a balance chamber supplied with fluid requires a separate fluid flow path and control system, thereby increasing the complexity of the clutch system for a prior transmission system having increased rotation speeds of the clutch systems as compared to the reduced rotational speeds of the clutch systems 60, 62 of the presently disclosed transmission mechanism 10. The difficulties arising from the fluid supply systems for conventional dual clutch transmission systems are discussed in the published application US 2005-0067251.

The above described use of differing gear ratios upstream of the clutch systems 60, 62 and the resultant reduced rotational speeds of the clutch systems 60, 62 has the additional benefit of reducing clutch drag in the clutch systems 60, 62. The clutch systems 60, 62 inherently must overcome drag forces generated by the differential speed between the input side of the clutch system 60, 62 and the output side of the clutch system 60, 62. More specifically, clutch drag is inherently generated due to resistance between fluid surrounding components of the clutch systems 60, 62 and the components themselves, as well as such as between the alternating input side clutch plates 92 and outside side clutch plates 94 when they are not engaged.

The amount of drag of the clutch system 60, 62 is a function of the fluid flow rate and the rotational differential between the input side of the clutch system 60, 62 and the output side of the clutch system 60, 62. For example, at higher rotational speeds on the input side of the clutch system 60, 62 the drag is increased as compared to the drag at lower rotational speeds on the input side of the clutch system 60, 62 for comparable fluid flows. Thus, the reduced rotational speeds of the input sides of the clutch systems 60, 62 can result in reduced clutch drag. As mentioned above, the reduced clutch drag of the clutch systems 60, 62 reduces the torque requirements for the synchronizers 120. As previously mentioned, lower torque capacity requirements for the synchronizers 120 permits the use of synchronizers 120 that are less costly, smaller sized and of reduced complexity as compared to synchronizers having higher torque capacities.

In the aspect of the example of the transmission mechanism 10 shown in FIGS. 1-3, each of the downstream gear ratios is provided by the ratio between the pinions 70, 72, 74, 76, 78, 80, 82 of the odd and even layshafts 20, 22, and their corresponding gears 100, 102, 104, 106, 108, 110 of the countershaft 50. As mentioned above, for low gears a higher gear ratio is desired, so the first gear pinion 70, for instance, is relatively small in comparison to its respective gear 100 provided on the countershaft 50 in order to reduce speed and increase torque of the countershaft 50. In contrast, the higher gears serve in an opposite manner to increase speed and reduce torque of the countershaft with respect to the layshafts 20, 22.

Therefore, the highest gear pinions 78, 80 on each layshaft 20, 22 have a purportedly large diameter relative to the corresponding gear portions (such as 108, 110) mounted on, or even machined into, the countershaft 50. In one aspect, the diameter and number of teeth of the high gear pinions 78 (fifth gear) and 80 (sixth gear) and the diameter and number of teeth of the gear 108, 110 on the countershaft 50 cooperate to provide the fifth and sixth gear ratios, respectively. Additionally, the gear ratio between the engine input shaft 24 and each of the odd and even clutch drive sprockets 42, 44, may be used to provide different upstream gear ratios that, in conjunction with the downstream gear ratios provided by the pinions 78 and 80 of the layshafts 20, 22 and the gears 108, 110 of the countershaft 50, provide the desired effective gear ratios.

In another aspect, it should be noted that the upstream gear ratios permit the gears 100, 102, 104 and 108 on the countershaft 50 to correspond to more than one effective gear ratio in conjunction with a combination of odd and even pinions, 70, 72, 74, 76, 78 and 80. For example, the countershaft gear 100 corresponding to the first gear pinion 70 (for the first gear ratio) may be the same as that corresponding with the second gear pinion 72 (for the second gear ratio). As depicted in FIG. 2, the fifth gear pinion 78 and sixth gear pinion 80, as well as a final drive gear 108 of the countershaft 50, which in turn drives the final drive gear, may utilize the same countershaft gear so that gear portions 108 and 110 machined or otherwise formed in the countershaft are one and the same. Also as depicted, third and fourth gear pinions 74, 76 may share a common gear where gear portions 104 and 106 are one and the same. With reference to FIG. 1, this sharing arrangement is achieved by allowing the pinions 70, 72, 74, 76, 78, 80 and 82 of each layshaft 20, 22 to approach and communicate with the countershaft 50 from different directions from each other, as well as from the output drive or final drive gear 52 from the countershaft 50. Such sharing further reduces the axial length of the transmission 10 in comparison to prior transmission systems by reducing the number of gears on the countershafts 50, and can be less expensive and easier to manufacture.

As mentioned above, there is a range of particular gear ratios between the input shaft 24 and the countershaft 50, depending on which gear pinion 70, 72, 74, 76, 78, 80, and 82 and corresponding gear 100, 102, 104, 106, 108 and 110 is utilized and which clutch system 60, 62 is engaged. Thus, the engine input sprocket and the odd and even clutch drive sprockets 42, 44 also are selectively sized for a desired range of gear ratios. That is, the transmission mechanism 10, as described herein, may be paired with a variety of engine input sprockets 28 and clutch drive sprockets 42, 44 having different diameters and number of teeth, and thus the upstream gear ratios may be altered accordingly. This allows the transmission mechanism 10 to be used in a variety of applications requiring different desired gear.

This is particularly useful as the first gear pinion 70 on the odd layshaft 20, for instance, has a minimum required size to avoid mechanical failure, as does the gear 110 on the countershaft 50. Furthermore, increasing the size of gears located on the countershaft 50 may otherwise require enlarging the transmission mechanism 10 itself. More specifically, as mentioned above, the pinions associated with the lower gears, such as the first gear pinion 70, may be larger in the present form as the pinion 70 and the gear 100 do not require as high of a ratio therebetween, the effective gear ratio being also determined by the upstream ratio. Furthermore, the first gear pinion 70 may be sized large enough to accommodate a bearing and/or one-way clutch between the first gear pinion 70 and the odd layshaft 20.

It should be appreciated that the clutch systems 60, 62 may be independently actuated or engaged. Specifically, one of the clutch systems may be disengaged as the other is engaged so that the layshafts 20, 22 (and gear pinions 70, 72, 74, 76, 78, 80, and 82) may be sequentially engaged and disengaged. More specifically, during the time that one of the clutch systems 60, 62 is engaging, but not fully engaged, the other clutch system 60, 62 may be disengaging while not being fully disengaged. In other words, the engagement and disengagement of the respective clutch systems 60, 62 may be, to an extent, simultaneous. In a further aspect, the layshafts 20, 22 may each be partially engaged to provide a blended gear ratio.

Other details of the particular example of the dual clutch transmission mechanism 10 of FIGS. 1-3 include bearings 46(a-f) and 47(a-g), as indicated with reference to FIG. 2. More specifically, each of the odd and even layshafts 20, 22 and the countershaft 50 is supported relative to a housing 48 of the transmission mechanism 10 by the bearings 46(a-f), as illustrated in FIG. 2. The bearings 46, which may comprise thrust bearings, permit the odd and even layshafts 20, 22 and the countershaft 50 to rotate relative to the housing 48 of the transmission mechanism 10 while at the same time functioning to permit such rotation to be accomplished with minimal friction. More specifically, a bearing 46a is positioned adjacent the housing 48 and the even layshaft 22 between an end of the even layshaft 22, opposite an end of the even layshaft 22 operably connected to the output side of the even clutch system 62, and the synchronizer 120 associated with the second gear pinion 72.

Another bearing 46b is positioned adjacent the housing 48 and the odd layshaft 20 between the sixth gear pinion 80 and the even input sprocket 44 of the even clutch system 62. With respect to the countershaft 50, a bearing 46c is positioned at one end and another bearing 46d is positioned at an opposite end, as illustrated in FIG. 2. A bearing 46e is positioned adjacent the housing 48 and the odd layshaft 20 between an end of the odd layshaft 20, opposite the end of the odd layshaft 20 operably connected to the output side of the odd clutch system 60, and the first gear pinion 70. Another bearing 46f is positioned adjacent the housing 48 and the odd layshaft 20 at an end opposite the other bearing 46e, between the fifth gear pinion 78 and the odd input sprocket 42.

Each of the gear pinions 70, 72, 74, 76, 78 and 80 of the transmission mechanism 10 has a bearing 47(a-g), such as a roller bearing, positioned between the gear pinion 70, 72, 74, 76, 78 and 80 and the respective odd and even layshafts 20, 22, as illustrated in FIG. 2. The bearings 47(a-g) assist in reducing friction as the gear pinions 70, 72, 74, 76, 78 and 80 rotate relative to the respective odd and even layshafts 20, 22 when the gear pinions 70, 72, 74, 76, 78 and 80 are not engaged for rotation, via the synchronizers 120, with the respective odd and even layshafts 20, 22, and are being driven for free-wheeling rotation by the respective intermeshed gears 100, 102, 106 and 108 mounted to the countershaft 50. In order to further assist in reducing friction, each of the bearings 47 are provided with a flow of lubricating fluid through flow passages 21 and 23 formed in the odd and even layshafts 20, 22.

The transmission 10 operates to transmit power from the engine to the wheels of a vehicle. The engine itself operates within a range of revolutions per minute (RPM). If the engine RPM drop below a certain level, the engine will stall. Conversely, if the engine RPM exceeds a certain level, the engine is susceptible to damage, and a failing engine can cause damage or injury to as well as beyond the engine compartment. Accordingly, the transmission 10 operates to allow an output shaft from the engine (engine input shaft 24 to the transmission 10) to rotate within the engine operating range.

The transmission 10 converts the high rotational velocity of the engine input shaft 24 to an appropriate rotational velocity for accelerating, reducing and/or maintaining the velocity of the vehicle. During initial movement of the vehicle from rest or from a low velocity, either in reverse or first gear, a significant force is required to accelerate the vehicle. More appropriately, acceleration from a low speed requires a high torque through the drive train. During this acceleration at a low velocity, the transmission 10 reduces the comparatively high rotational velocity of the engine input shaft 24 to a lower-velocity, higher-torque rotation transmitted to the final drive gear 52 via the countershaft 50, using the different gear ratios discussed herein. Furthermore, the transmission 10 may be used to reverse direction of the countershaft 50 using a reverse idler gear 112 Positioned between the reverse gear pinion 82 of the odd layshaft 20 and the reverse gear 54 of the countershaft 50.

The transmission 10 may be controlled in a variety of manners. That is, a human operator or a control system, such as a microprocessor-based system, may monitor vehicular speed (monitored by, for instance, an anti-lock braking system), engine RPM, or other factors, in order to make a determination that the transmission mechanism 10 should be shifted. Accordingly and in response to an indication of a desired shift, the clutch systems 60, 62 may be selectively actuated, and the gear pinions 70, 72, 74, 76, 78, 80, 82 may be selectively engaged or disengaged for rotation with respective layshaft 20, 22.

Figure 4:
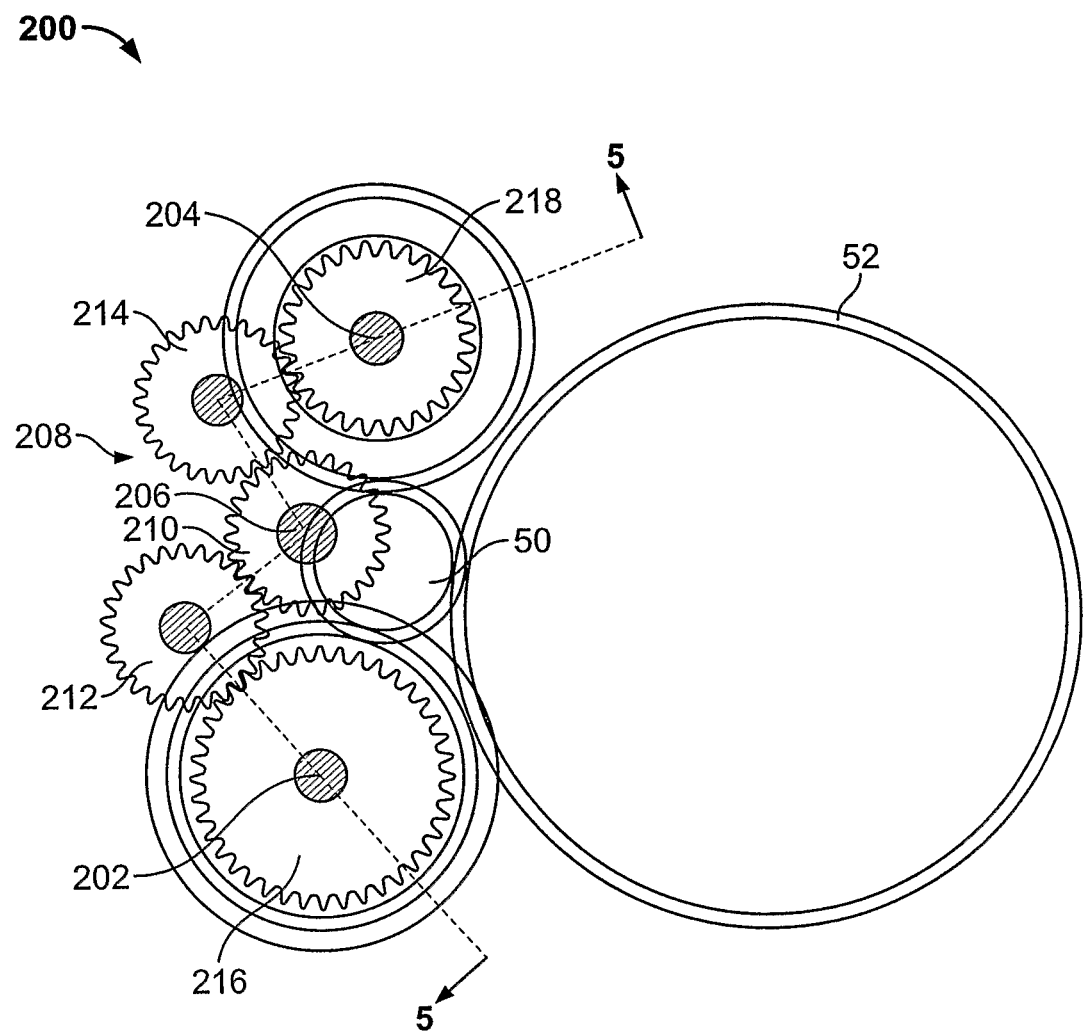
FIG. 4 is a representational front elevation view of an input side of a configuration of a dual clutch transmission mechanism having idler gears for driving the first or odd clutch drive gear and a second or even clutch drive gear via an engine input gear mounted on an engine input shaft.
Figure 5:
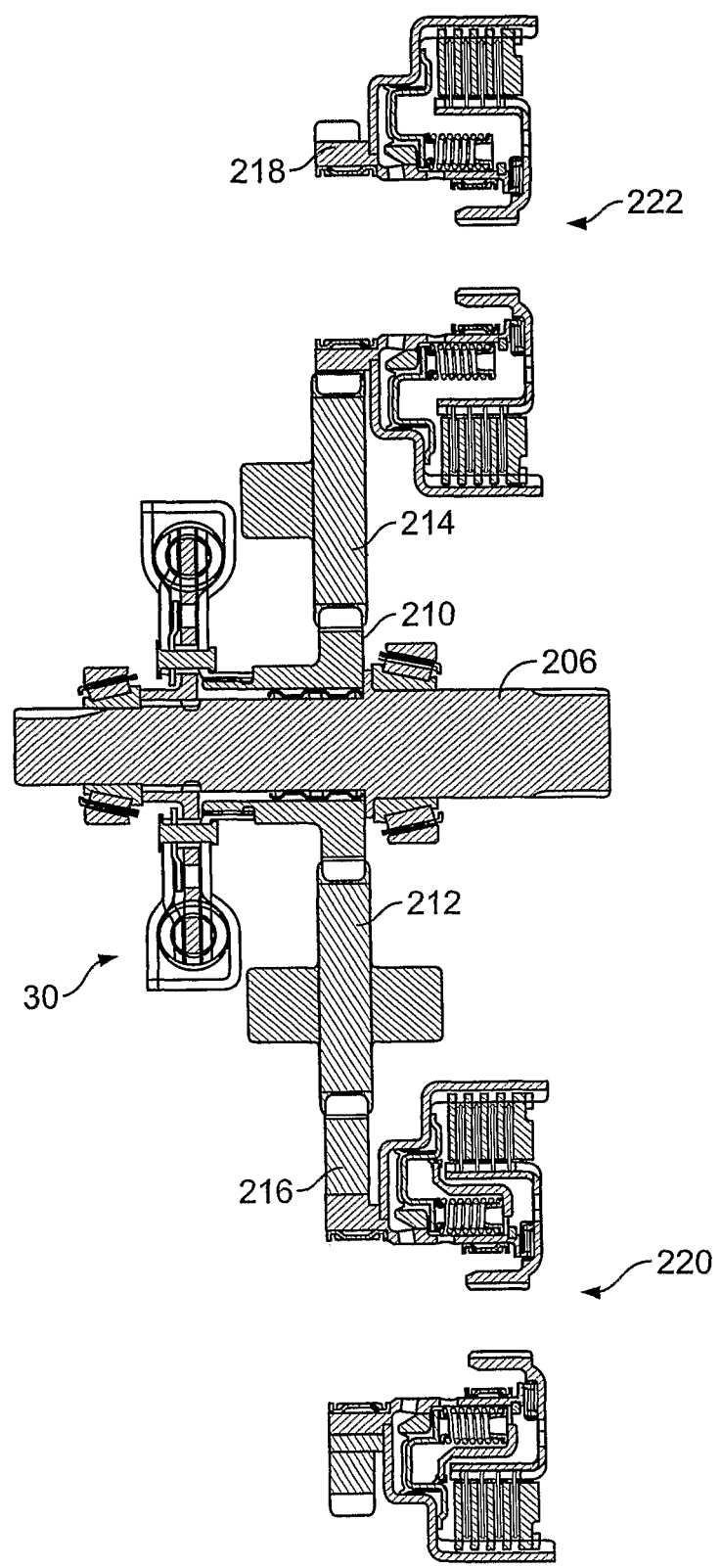
FIG. 5 is a cross-sectional view of the input side of the dual clutch transmission mechanism configuration of FIG. 4 taken along line 5-5.

Referring now to FIGS. 4 and 5, a further configuration for the input side of a transmission mechanism 200 is shown having an odd layshaft 202 and an even layshaft 204 in a parallel, side-by-side arrangement. An engine input shaft 206 includes an input mechanism 208 to provide power to the layshafts 202, 204 from the engine, and a damper 30 for reducing shock and vibration due to erratic or variable power from the engine, as will be discussed below. As shown, the input mechanism 208 includes, among other components, an engine input gear 210 engaged with a pair of spaced apart idler gears 212, 214. Each idler gear 212, 214 is further engaged with a respective clutch drive gear 216, 218 connected to the layshafts 202, 204. In this manner, power is delivered from the engine through the input shaft 206 and the input mechanism 208 so that the engine input gear 210 rotates both the idler gears 212, 214. The power is then transmitted from the idler gears 212, 214, to the clutch drive gears 216, 218.

More specifically, the power is transmitted from the idler gears 212, 214 through the clutch drive gears 216, 218 of the respective clutch systems 220, 222 to the layshafts 202, 204 when one or the other of the clutch systems 220, 222 is engaged, as can be seen in FIG. 5. The layshafts 202, 204 are substantially similar to the layshafts 20, 22, discussed above, in that, although not shown, they include a plurality of gears pinions corresponding with gears on a countershaft for providing a series of gear ratios for transmitting torque from the engine to the power train.

As shown, the engine input shaft 206 transmits ratio power to each of the layshafts 202, 204. The engine input gear 210, idler gears 212, 214, and clutch drive gears 216, 218 each have a specific number of teeth which may be used to provide an upstream gear ratio therebetween. In the form shown, each of the idler gears 212, 214 and the engine input gear 210 have the same number of teeth and are the same size so that standard parts may be used for each. The principal manner for providing the upstream gear ratio between the input shaft 206 and the layshafts 202, 204 is by providing the engine input shaft gear 210 with a different diameter and a different number of teeth than the clutch drive gears 216, 218. Preferably, each of the clutch drive gears 216, 218 also has a different number of teeth and size so that the layshafts 202, 204 have different associated with upstream gear ratios and thus different rotational speeds. As an example, the engine input gear 210 and idler gears 212, 214 may each have twenty-six teeth, the clutch drive gear 218 may have twenty-eight teeth, and the clutch drive gear 216 may have forty teeth.

Figure 6:
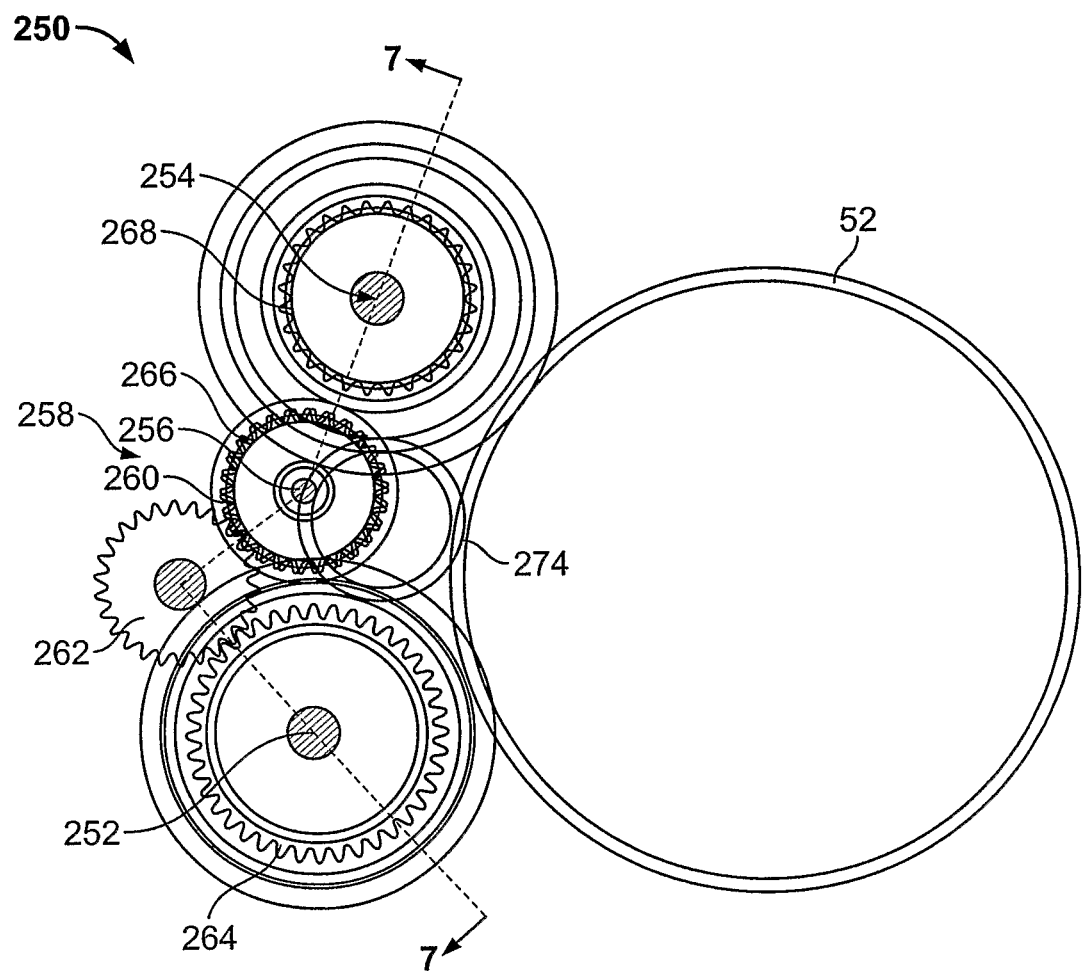
FIG. 6 is a representational front elevation view of an input side of a configuration of a dual clutch transmission mechanism having an idler gear for driving the first or odd clutch drive gear via an input gear mounted on an input shaft and a chain for driving a second or even clutch drive sprocket via an engine input sprocket mounted on the engine input shaft.
Figure 7:
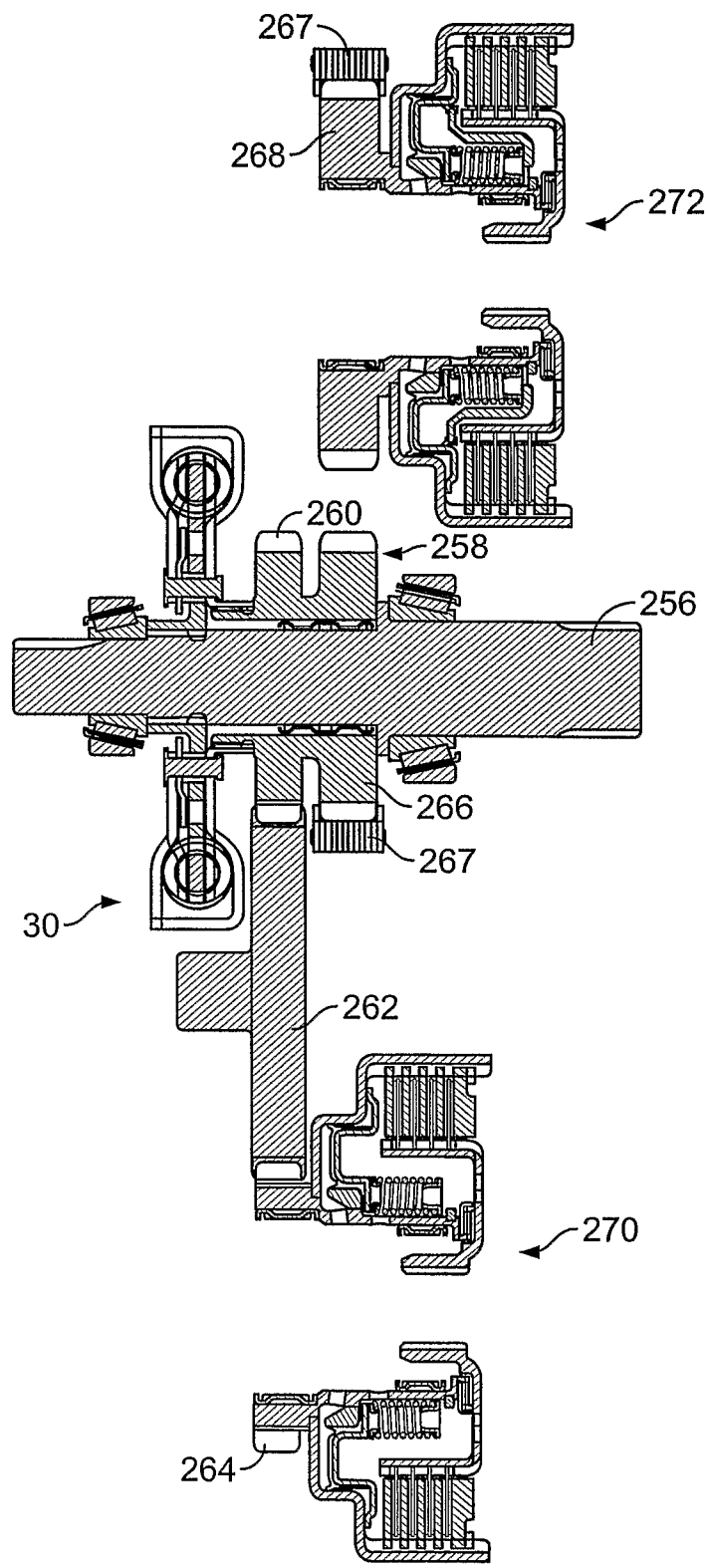
FIG. 7 is a cross-sectional view of the input side of the dual clutch transmission mechanism configuration of FIG. 6 taken along line 7-7.

With reference to FIGS. 6 and 7, another configuration for the input side of a transmission mechanism 250 is shown having parallel odd and even layshafts 252, 254 in a side-by-side arrangement. An engine input shaft 256 is connected to an input mechanism 258. A damper 30 is provided for reducing shock and vibration due to erratic or variable power from the engine.

Engine input gear 260 cooperates and engages with an idler gear 262, which in turn cooperates and engages with a clutch drive gear 264 operatively connected through an odd clutch system 270 to an odd layshaft 252 for transmitting torque from the engine input shaft 256 to the odd layshaft 252. The engine input mechanism 258 also includes an engine input sprocket 266 which cooperates with a chain 267, as illustrated in FIG. 7, to transmit torque to a clutch drive sprocket 268 operatively connected through an even clutch system 272 to the even layshaft 254.

As can be seen, when the engine input mechanism 258 is connected to the even layshaft 254 via a chain, both the even layshaft 254 and the engine input shaft 256 rotate in the same direction. In contrast, shafts connected by gears (without intermediate idler gears) will rotate in opposite directions. Therefore, the idler gear 262 is provided between the engine input gear 260 of the input mechanism 258 and the clutch drive gear 264 of the odd shaft 252. In this manner, both layshafts 252, 254 are driven in the same rotational direction.

In the manner discussed above, the engine input shaft 256 transmits power from the engine through the engine input mechanism 258 including the engine input gear 260 and the engine input sprocket 266 to the layshafts 252, 254 via the respective clutch systems 270, 272, as best seen in FIG. 7. The layshafts 252, 254 are substantially similar to the layshafts 20, 22, discussed above, and include a series of pinions (not shown) cooperating with a series of gears (not shown) on a countershaft 274 to provide gear ratios for transmitting torque from the engine to the power train. Each of the odd and even pinions mounted on the layshafts 252, 254 cooperates with the countershaft 274, similar to the countershaft 50 discussed above, to transmit power to the final drive gear 52 from the countershaft 274.

The torque from the engine input shaft 256 is ratioed for each of the layshafts 252, 254. For the odd layshaft 252, the ratio may be achieved by selecting the relative numbers of teeth and diameters of each of the engine input gear 260, the idler gear 262, and the clutch drive gear 264. For the even layshaft 254, the ratio is achieved by selecting relative numbers of teeth and diameters on the engine input sprocket 266 and the clutch drive sprocket 268. Each of the ratios between the input shaft 256 and the odd layshaft 252 and even shaft 254 may be selected to provide a relative ratio between the odd and even layshafts 252, 254, as desired and as desired in relation to the embodiments above.

Figure 8A:
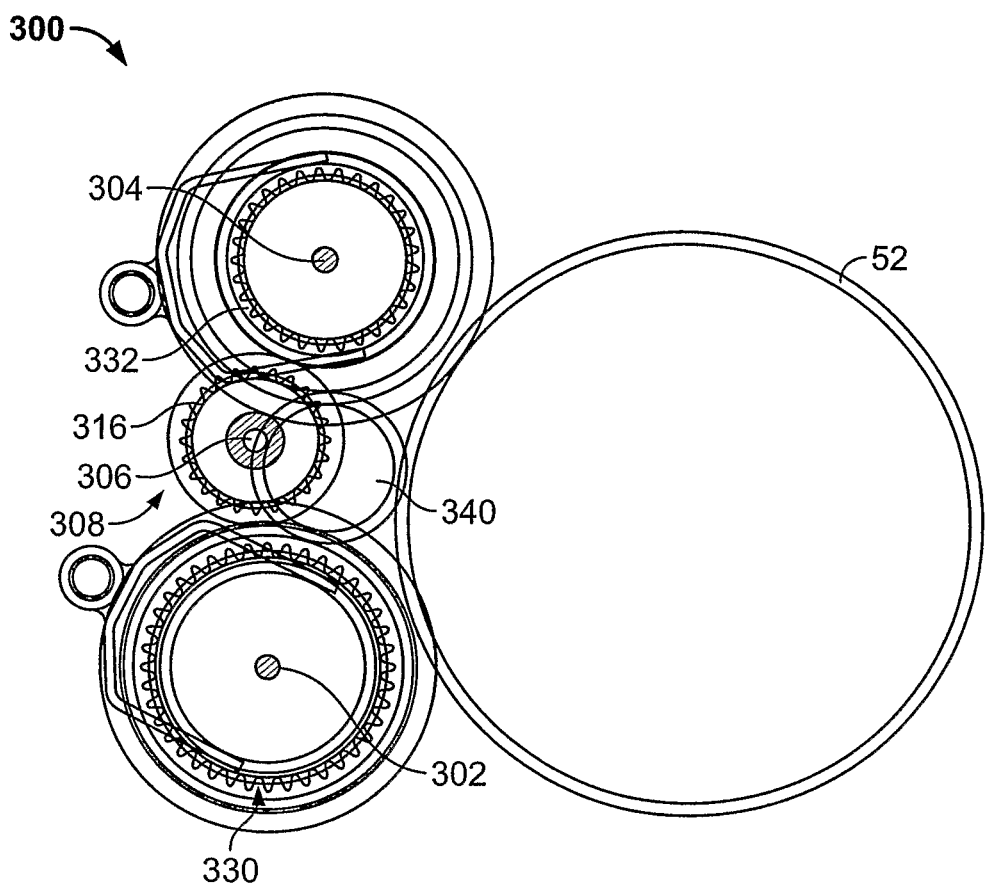
FIG. 8A is a representational front elevation view of an input side of a configuration of a dual clutch transmission mechanism having a first chain for driving a first or odd clutch drive sprocket via a first engine input sprocket mounted on an engine input shaft and a second chain for driving a second or even clutch drive sprocket via a second engine input sprocket mounted on the engine input shaft.
Figure 8B:
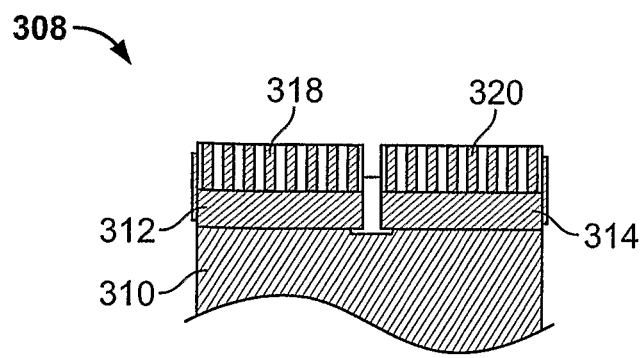
FIG. 8B is a fragmentary cross-sectional view of the first and second input sprockets and the first and second chains of the configuration of FIG. 8A taken along line 8-8.

Turning now to FIGS. 8A-B, an additional configuration for an input side of a transmission mechanism 300 having parallel odd and even layshafts 302, 304 arranged in a side-by-side manner is depicted for transmitting power from the engine to a final drive gear 52. An engine input shaft 306 is provided with a damper 30, discussed below, and an input mechanism 308 for communicating power to the odd and even layshafts 302, 304. As can be seen in comparing FIGS. 8A and 8B, the input mechanism 308 includes an engine input sprocket 310 having first and second generally identical rows 312, 314 of sprocket teeth 316. The sprocket teeth rows 312, 314 each drive a separate chain 318 or 320 to transmit torque from the engine input mechanism 308 and engine input shaft 306 to the layshafts 302, 304 through an odd clutch system and even clutch system (not shown).

The upstream or input sides of the clutch systems include respective clutch drive sprockets 330, 332 being driven by the chains 318, 320. More specifically, the odd layshaft 302 is operatively connected through the odd clutch system to the sprocket 330 for cooperating with the chain 318, and the even shaft 304 is operatively connected through the even clutch 355 with clutch drive sprocket 332 for cooperating with the chain 320. Each of the layshafts 302, 304 receives torque from the input shaft 306 via the respective clutch systems, as described above, and transmits the power to a countershaft 340 via pinions on the layshafts 304, 330 and corresponding gears on the countershaft 340.

As noted for the previous embodiments, the rotation of the engine input shaft 306 may be ratioed to the rotation of the odd and even shafts 302, 304. This may be done by selection of a diameter and number of teeth for the clutch drive sprockets 330, 332 relative to the same for the rows 312, 314 of teeth 316 of the engine input mechanism 308. Likewise, a ratio may be provided between the odd clutch drive sprocket 330 and the even clutch drive sprocket 332 by selecting relative diameters and numbers of teeth thereof.

Figure 9:
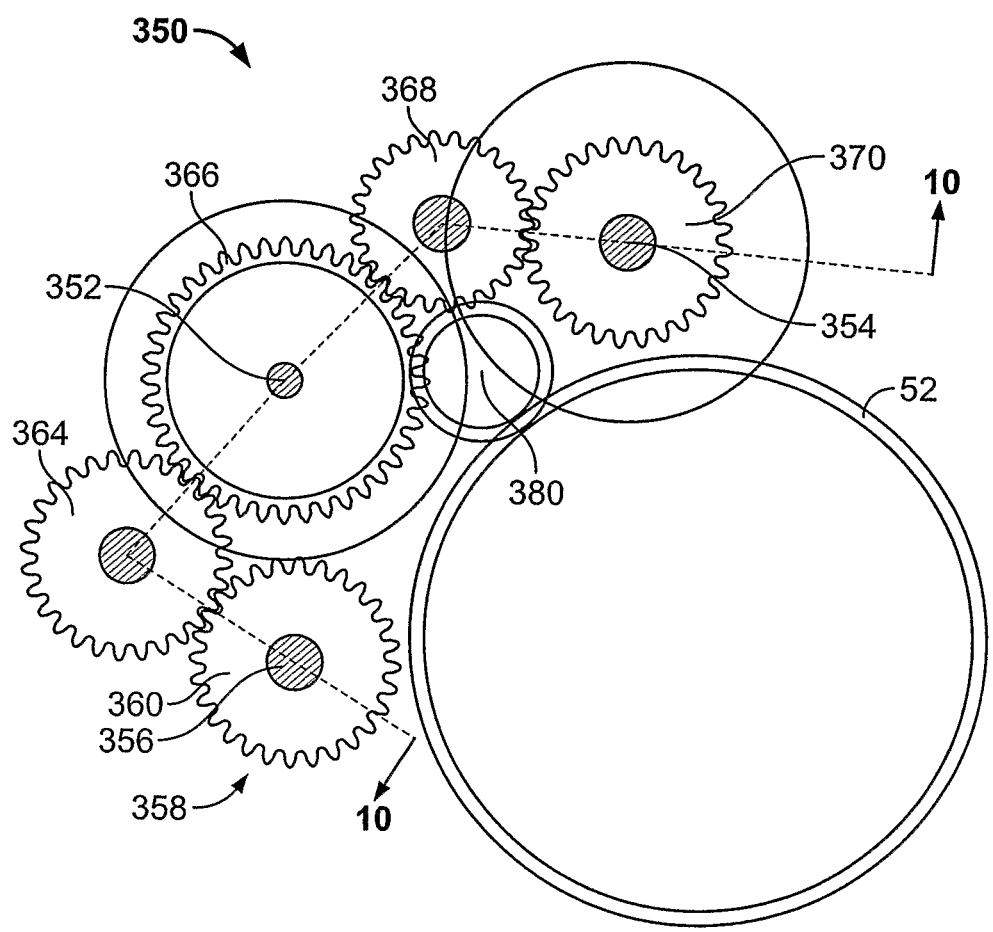
FIG. 9 is a representational front elevation view of an input side of a configuration of a dual clutch transmission mechanism having idler gears driving an a first or odd clutch drive gear and a second or even clutch drive gear via an engine input gear mounted on an engine input shaft.
Figure 10:
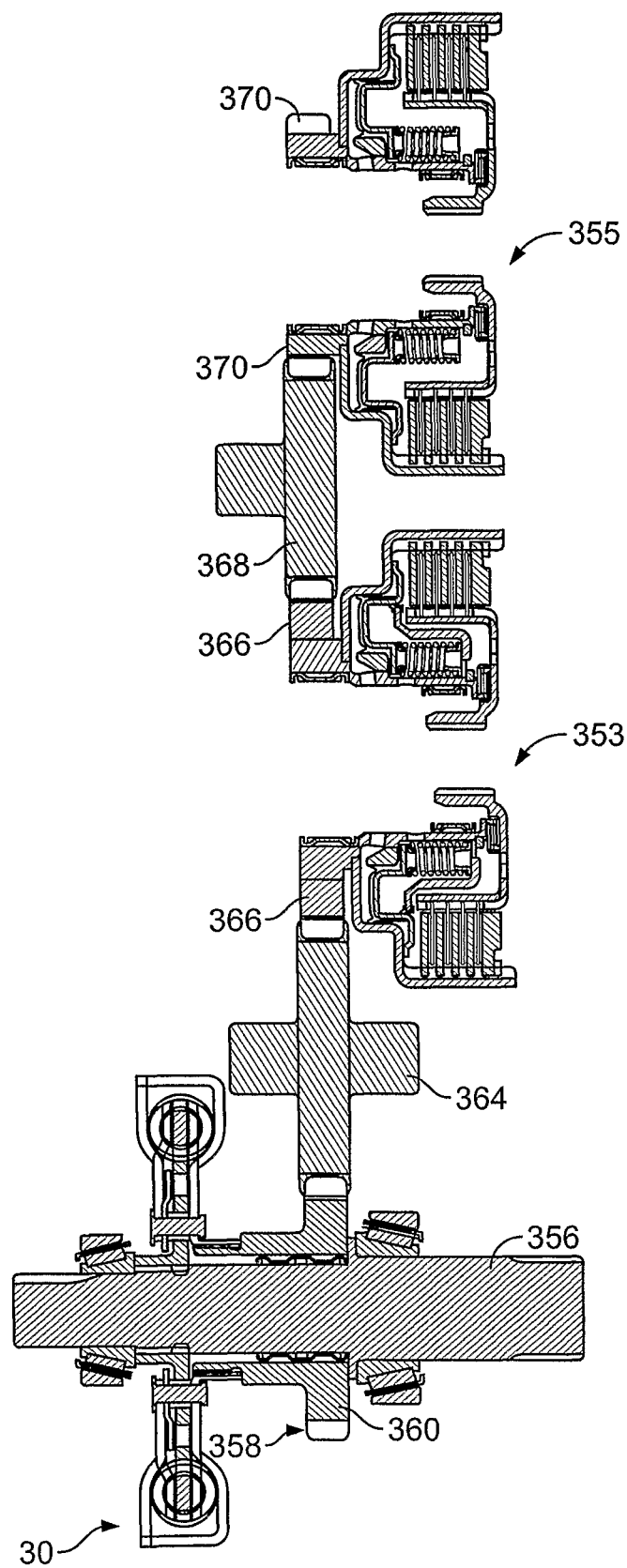
FIG. 10 is a cross-sectional view of the input side of the dual clutch transmission mechanism configuration of FIG. 9 taken along line 10-10.

Referring to FIGS. 9 and 10, a configuration of an input side a transmission mechanism 350 is illustrated having odd and even layshafts 352, 354. The engine input shaft 356 has an engine input mechanism 358 including, among other components, an engine input gear 360 and a damper 30. The engine input gear 360 cooperates with and is engaged with a first idler gear 364 which cooperates with and is engaged with an odd clutch drive gear 366 operatively connected through an odd clutch system 353 to the odd layshaft 352. Thus, the odd layshaft 352 and engine input shaft 356 rotate in the same direction when the odd clutch system 353 is engaged.

The odd clutch drive gear 366 further is engaged with a second idler gear 368, which is then engaged with an even clutch drive gear 370. The even clutch drive gear 370 is operatively connected to the even layshaft 354 through the even clutch system 355. By using the second idler gear 368, each of the odd layshaft 352, engine input shaft 356, and even layshaft 354 rotate in the same direction when their respective clutch systems 353, 355 are engaged. The layshafts 352, 354 each carry pinions (not shown) engageable with corresponding gears (not shown) mounted on a countershaft 380, as has been described for providing downstream gear ratios, for transmitting torque to the output final drive gear 52. The upstream ratios, i.e., ratios between the engine input gear 36 and clutch drive gears 366, 370 are obtained by the relative selections of the diameter and numbers of teeth on the clutch drive gears 366, 370 and the engine input gear 360, as has been described.

Figure 11:
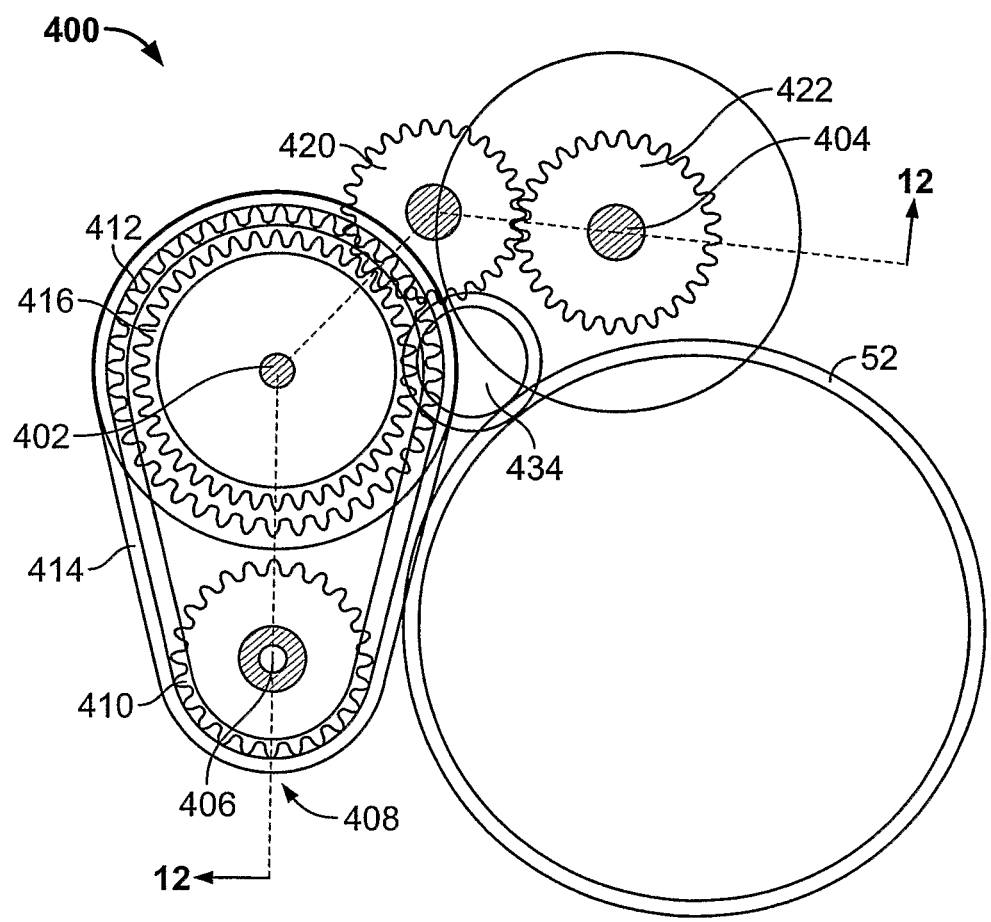
FIG. 11 is a representational front elevation view of an input side of a configuration of a dual clutch transmission mechanism having a chain driving a first or odd clutch drive sprocket/gear via an engine input sprocket mounted on an engine input shaft and an idler gear driving a second or even drive gear via the first or odd clutch drive sprocket/gear.
Figure 12:
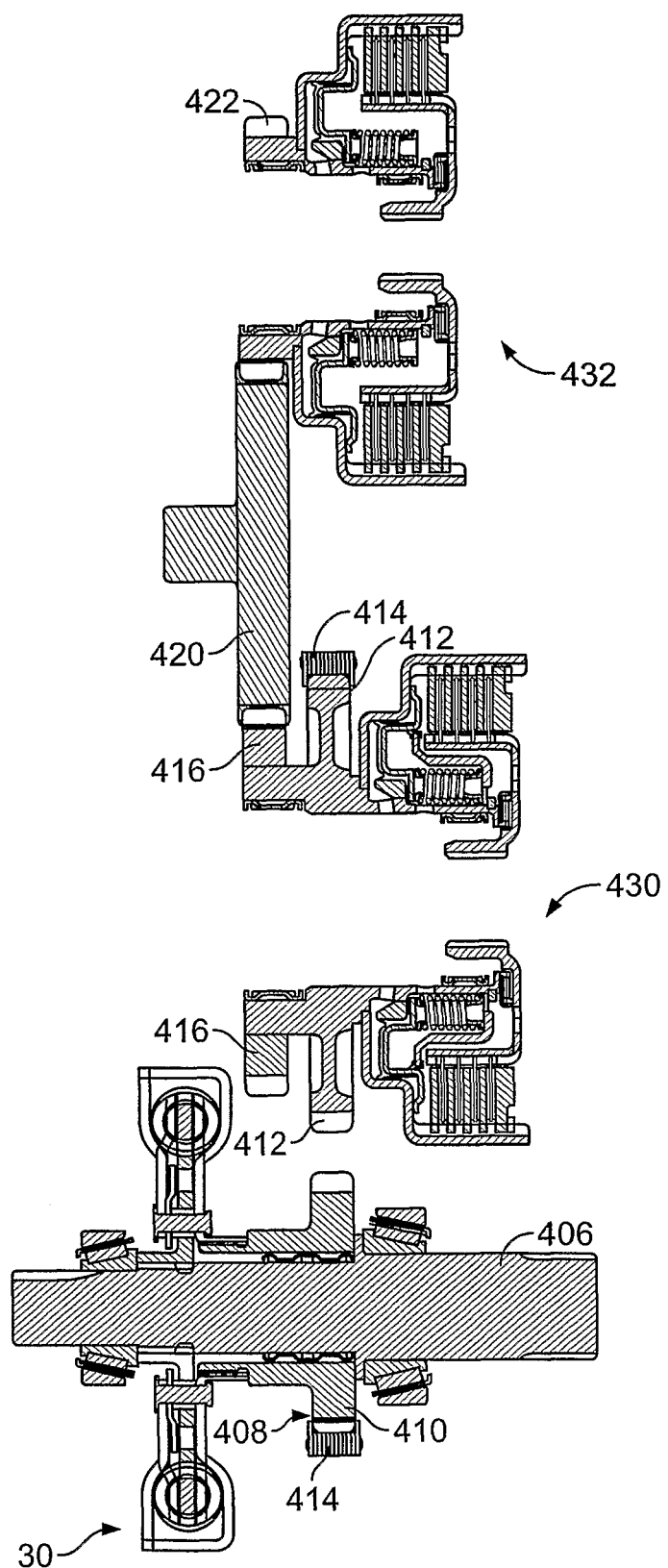
FIG. 12 is a cross-sectional view of the dual clutch transmission mechanism configuration of FIG. 11 taken along line 12-12.

With reference to FIGS. 11 and 12, an input side configuration for a transmission mechanism 400 is shown utilizing an engine input shaft 406, an odd layshaft 402, and an even lay shaft 404. As in the transmission mechanism 350, the engine input shaft 406 transmits power to the odd layshaft 402 through an odd clutch system 430, which in turn transmits power to the even layshaft 404 through an even clutch 432 system. The engine input shaft 406 also includes a damper 30 which reduces vibration transmitted from the engine.

The engine input shaft 406 includes an engine input mechanism 408 including, among other components, an engine input sprocket 410. The engine input sprocket 410 transmits torque via a chain 414 to an odd clutch drive sprocket 412 operatively connected with the odd layshaft 402 through the odd clutch 430 system. The odd layshaft 402 is also connected with an odd clutch drive gear 416, best seen in FIG. 12. The odd clutch drive gear 416 is engaged with an idler gear 420, which in turn is engaged with an even clutch drive gear 422 operatively connected through an even clutch system 432 with the even layshaft 404. Thus, torque from engine input shaft 406 is transmitted via the engine input sprocket 410 to the chain 414 and then to the odd clutch drive sprocket 412. The odd clutch drive sprocket 412 and odd clutch drive gear 416 co-rotate with the odd layshaft 402 so that the odd clutch drive gear 416 transmits the torque to the idler gear 420 and then to the even clutch drive gear 422 operatively connected to the even layshaft 404 via the even clutch system 432. The layshafts 402, 404 are selectively engaged via respective the clutch systems 430, 432 to transmit the power from the layshafts 402, 404 through their respective pinions (not shown) to the gears (not shown) of a countershaft 434 to the output final drive gear 52 at selected gear ratios, are discussed above.

The upstream gear ratios provided between the engine input shaft 406 and each of the layshafts 402, 404, which act in combination with the downstream gear ratios between pinions of the layshafts 402, 404 and the corresponding gears of the countershaft 432 are determined by the diameter and the relative number of teeth on the engine input sprocket 410, the clutch drive sprocket 412, the odd drive gear 416, the idler gear 420, and the even clutch drive gear 422. It should be noted that the idler gear 420 allows the even and odd layshafts 404, 402 to rotate in the same direction.

As has been noted, a damper may be provided with each transmission. In FIG. 3, it can be seen that the damper 30 is provided on the input shaft 24 for reducing the effect of vibration, and shock, due to erratic or variable power from the engine. As shown, the damper 30 is located on an inboard side of the engine input shaft 24, that is, inside the transmission mechanism in a position such that the input mechanism 26 is between the damper 30 and the engine. Similarly, each of the other transmission mechanisms described herein may be equipped with the damper 30, as is shown. Each of the other previously-described transmissions 200, 250, 300, 350, and 400 are shown with a similar positioning for the damper 30. However, with reference to FIG. 13, a damper 450 of a transmission mechanism 448 may alternatively be located on an engine input shaft 452 so that it is positioned between the engine and an engine input mechanism 452, depicted as including a engine input sprocket 454 driving a chain 456.

Figure 13:
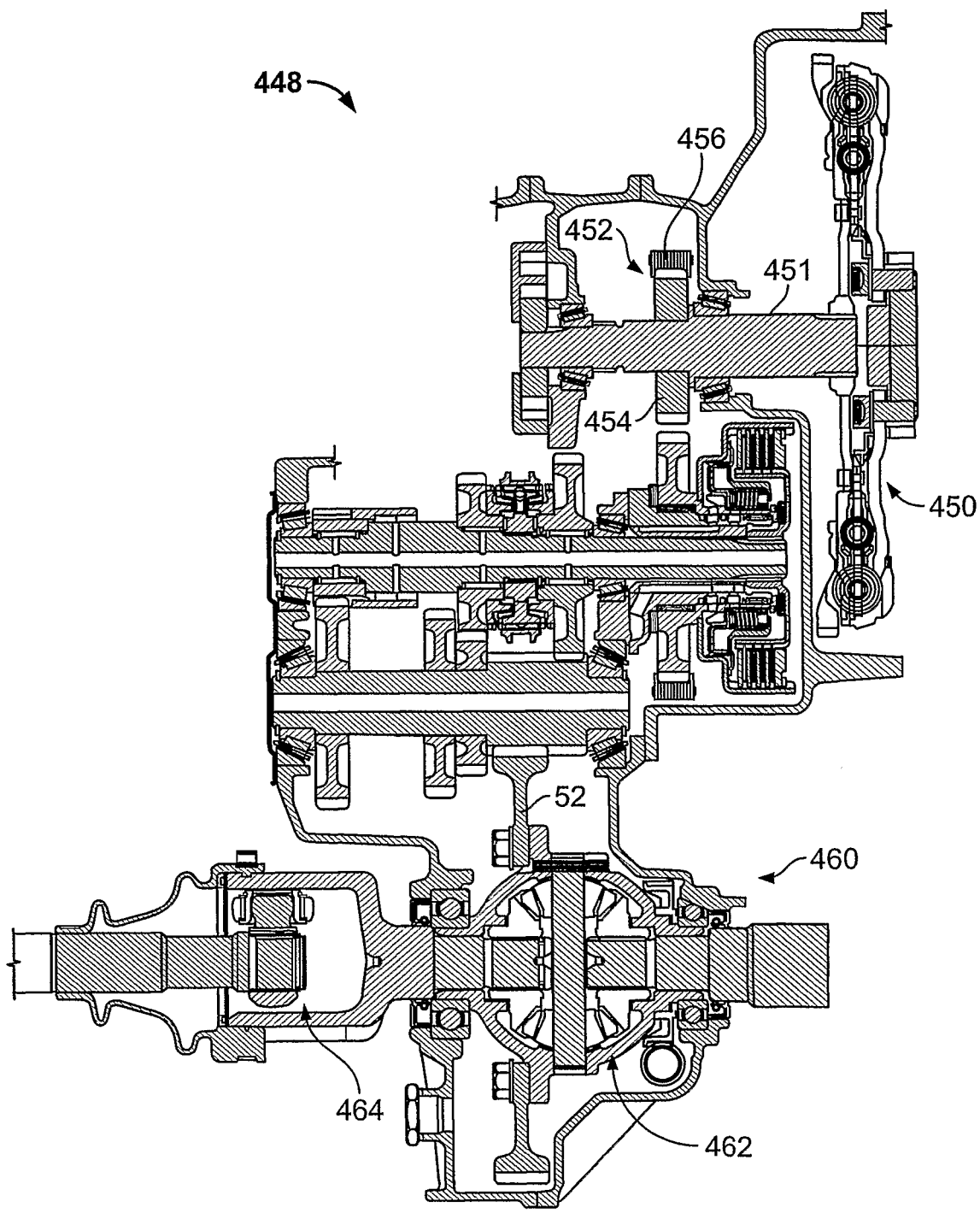
FIG. 13 is a cross-sectional view of another configuration of a dual clutch transmission mechanism showing an engine input shaft, a countershaft and a first or odd layshaft, a pump concentrically mounted on the engine input shaft, an external damper and a one way clutch between the first or odd layshaft and a first gear pinion.

For the configuration of FIG. 3, for instance, the damper 30 is located in a so-called wet area. More precisely, the damper 30 is located within a portion of the transmission mechanism 10 subject to a substantially continuous flow of oil or other lubricants. In the configuration of the transmission mechanism 448 of FIG. 13, the damper 450 is located within a portion of the transmission mechanism 448 which is not typically bathed in lubricant and is, thus, referred to as a dry area. As can be seen, the damper 450 of the transmission mechanism 448 of FIG. 13 is comparatively larger than the damper 30 of the transmission mechanism 10 of FIGS. 1-3. Accordingly, a larger damper, such as damper 450, can be used with the various transmission mechanisms. A larger damper can allow for use with higher torque engines to provide the desired levels of torque transmission while still providing for dampening.

In selecting among the different configurations for the input sides of transmission mechanisms, such as those configurations illustrated in FIGS. 1 and 4-12, there are a number of different considerations. For instance, configurations of the input sides of the transmission mechanisms utilizing gears for communicating from the engine input shaft to the input sides of the clutch systems such as those configurations illustrated in FIGS. 4, 5, 9, 10, can be stronger and can be used with engines running at higher speeds, such as a turbocharged engine. The gears also can generally have a longer serviceable life than a chain-and-sprocket drive configuration.

However, use of gears in this manner typically requires inclusion of one or more idler gears to enable the input sides of the clutch systems, and thus the output sides of the clutch systems and the associated layshafts, to rotate in the same direction as each other and as the engine input shaft. In other words, a single chain and a pair of sprockets is generally cost-competitive with a pair of gears, but a pair of clutch drive gears driven by one or more idler gears is typically more costly than the chain-and-sprocket arrangement. Therefore, using gears as opposed to sprockets may lead to an increase in the overall cost of the system. However, any costs benefits are balanced with other considerations in determining the appropriate input side configuration of the transmission mechanism.

Another consideration for selecting among the different configurations of the input side of the transmission mechanisms is the flexibility provided for packaging of the transmission mechanism in the engine compartment. As discussed, the axial length of the transmission can be shortened in comparison with other known dual-clutch systems. The relative orientation of the components of the configurations as shown may be altered to provide a transmission with a different overall size or geometry, which allows the transmission to be tailored to the space permitted within the engine compartment by the other components therewithin. In some vehicles, the relative positions of a transaxle, the transmission, and the engine can present configuration, space, and/or other installation issues. The various transmissions described herein can provide for a varying distance, including a very small distance, between a centerline of the input shaft and a centerline of the output drive or final drive gear. The various configurations, then, can allow for the relative distance between these centerlines to be moved or selected depending upon the particular design parameters for the application of the transmission mechanism.

With reference to FIG. 13, a transmission mechanism 448 is depicted in a relative orientation with a portion of a transaxle 460 having a differential 462. The transaxle 460, as depicted, is positioned left-to-right, or port-to-starboard, in an engine compartment. Accordingly, a constant-velocity (CV) joint 464 is shown for providing power to a left front wheel of a front wheel drive vehicle. The CV joint 464 is positioned inboard of the left front wheel, and the differential 462 cooperating with the final drive gear 52 is to the right of the CV joint 464. The final drive gear 52 receives the power from the transmission mechanism 448.

As shown, the transaxle 460, as well as a number of other components located in the engine compartment, has minimum operational and installation requirements. As can be appreciated, the configuration and installation of the transmission mechanism 448, as well as other transmission mechanisms discussed herein, benefits from providing options in configuring the transmission mechanism to allow flexibility in its arrangement in an engine compartment and installation requirements. For instance, the reduced axial length of the transmission mechanism 448, when compared with prior transmission systems, provides greater flexibility in locating components to the port or starboard sides of the transmission mechanism 448, and greater flexibility in locating the engine within the engine compartment for providing input power to the input shaft 451.

Figure 14:
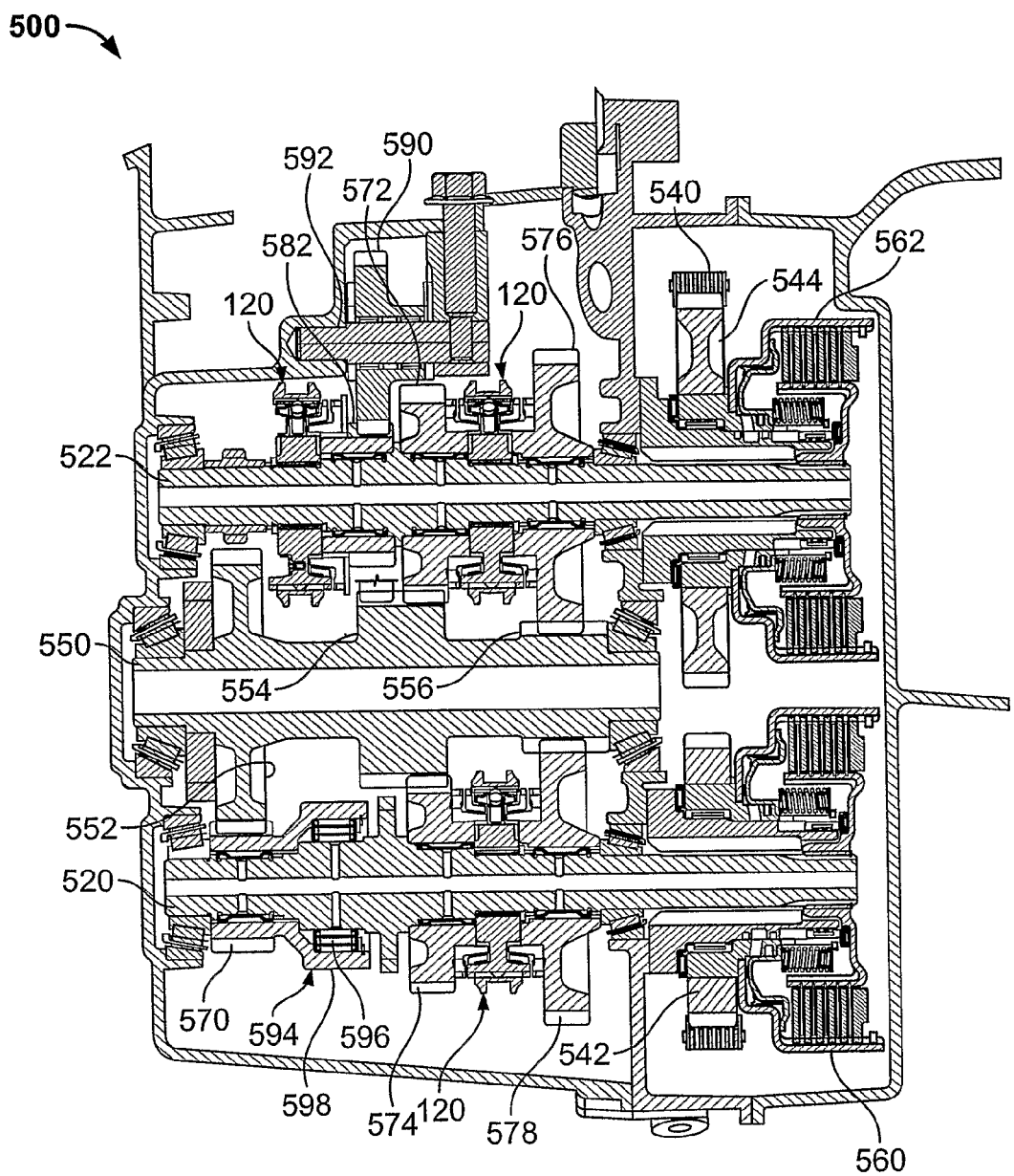
FIG. 14 is a cross-sectional view of a configuration of a dual clutch transmission mechanism having five speeds and showing a first or odd layshaft, a second or even layshaft and a countershaft, a one-way clutch between a first gear pinion and the first or odd layshaft and a synchronizer-operated reverse gear.
Figure 15:
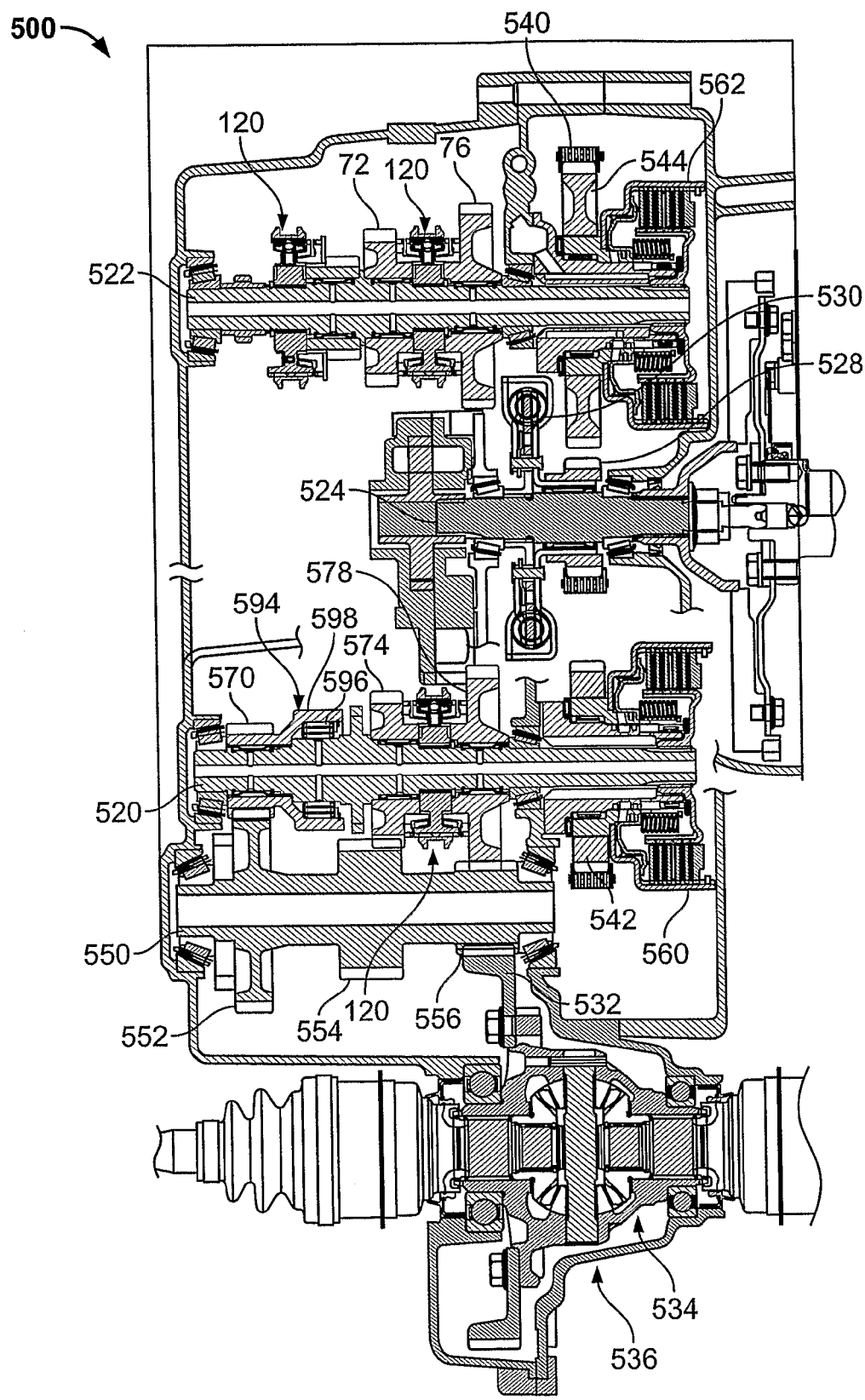
FIG. 15 is a different cross-sectional view of the configuration of the dual clutch transmission mechanism of FIG. 14 showing the first or odd layshaft, the countershaft and an engine input shaft, the one way clutch between the first or odd layshaft and the first gear pinion and an internal damper.
Figure 16:
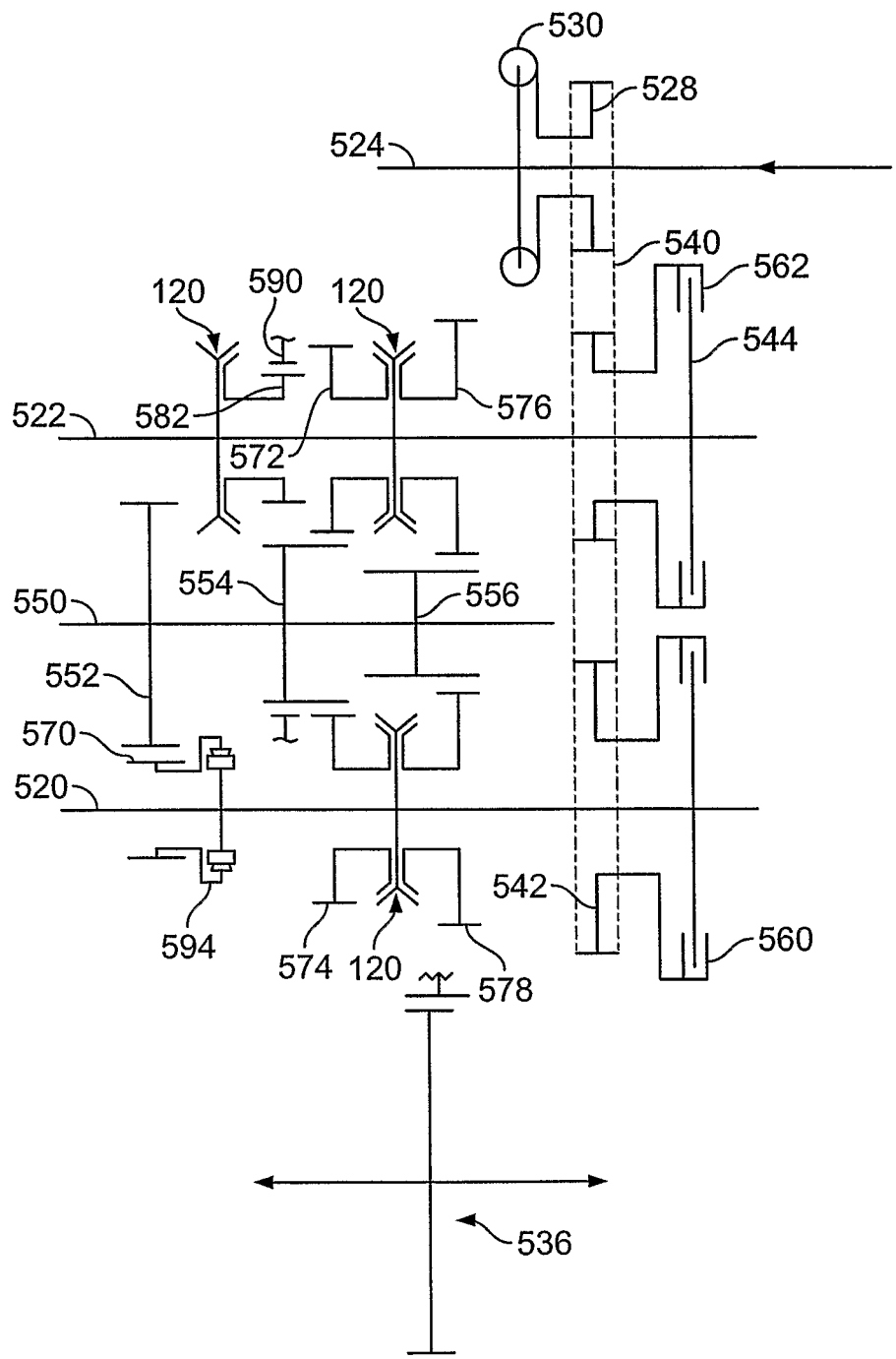
FIG. 16 is a schematic representation of the power flow of the configuration of dual clutch transmission mechanism of FIGS. 14 and 15.
Figure 17:
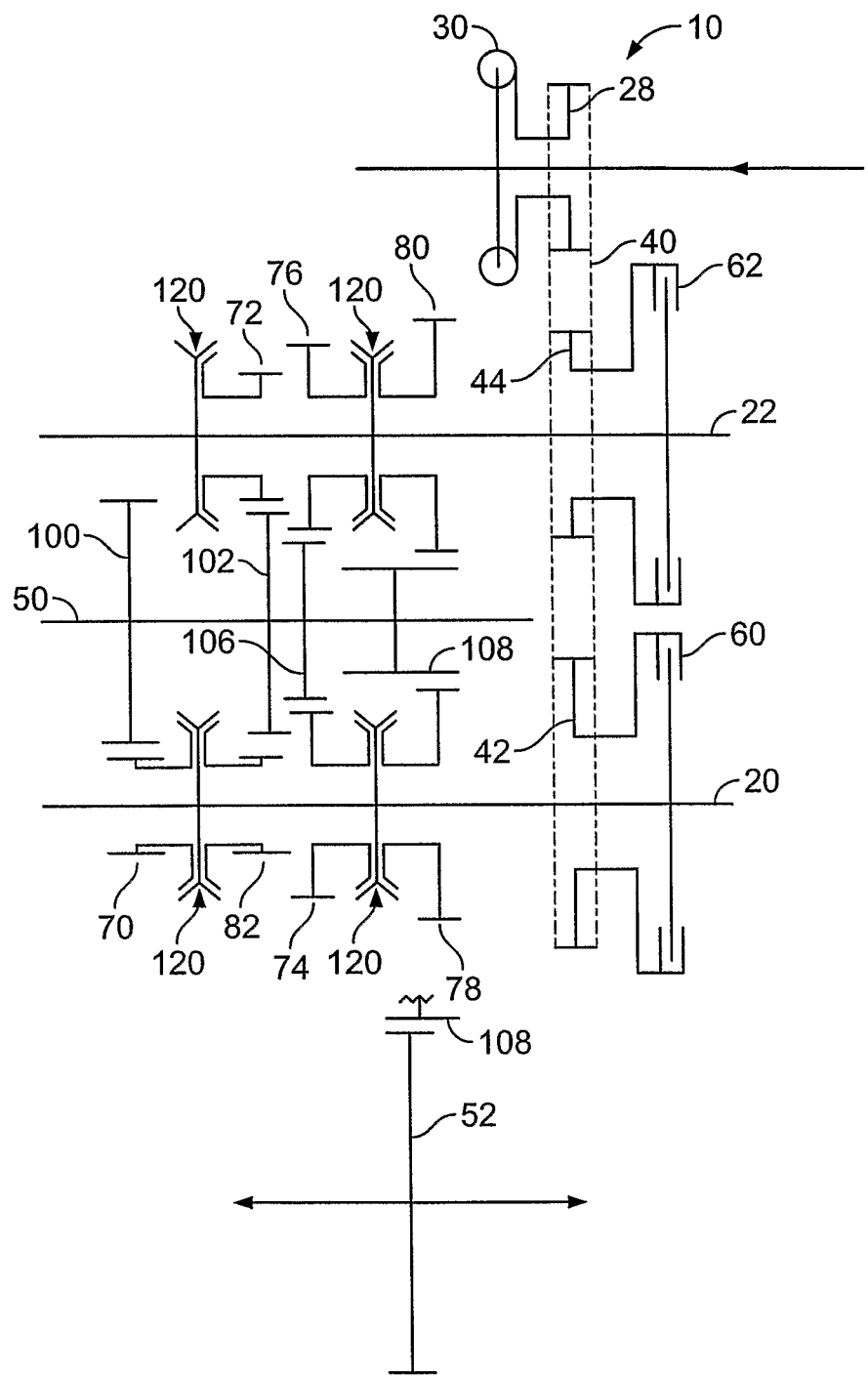
FIG. 17 is a schematic representation of the power flow of the dual clutch transmission mechanism configuration of FIGS. 1-3.

Another example of a dual clutch transmission mechanism 500, having five forward speeds as opposed to the six forward speeds of the dual clutch transmission mechanism 10 of FIGS. 1-3, incorporates a one-way clutch 594 between one of the pinions. In one example, the first gear pinion 570, and one of the layshafts, in this example the odd layshaft 520, is illustrated in FIGS. 14-16. The one-way clutch 594 eliminates a need for a synchronizer 120 to be used for engaging the associated pinion 570 with the respective input shaft 520, which can reduce the number of synchronizers 120 that are used in the dual clutch transmission mechanism 500 and thereby reduce the cost of the transmission mechanism 500.

As discussed above, prior transmission systems require a first gear pinion having a very small diameter because the entire first gear ratio is determined by the ratio between the first gear pinion located on the layshaft and the relatively large corresponding first gear located on the countershaft. As also discussed above, this requirement for a minimum diameter first gear pinion has the result that the first gear pinion is often machined into the layshaft, which certainly would prevent the use of a one-way clutch between the first gear pinion and the layshaft. The provision in the present transmission 500 of both gear ratios between the engine input clutch input, and gear ratios between the layshaft pinions and countershaft gears, working in combination, permits a reduction in the size disparity between the first gear pinion 570 and the corresponding first gear 552, as also discussed above. Thus, the diameter of the first gear pinion 570 can be increased by an amount sufficient to place the one-way clutch 594 between the odd layshaft 520 and the first gear pinion 570.

In the illustrated example, the one-way clutch 594 includes a portion have the first gear pinion 570 formed thereon and an adjacent race portion 598. A set of one-way clutch bearings 596 are positioned between the race portion 598 of the one-way clutch 594 and the odd layshaft 520. When the input shaft 524 drives both the odd layshaft 520 and the even layshaft 522 for rotation up to a preselected maximum rotational speed, the one-way clutch bearings 596 will frictionally engage between the race portion 598 of the one-way clutch 594 and the odd layshaft 520 to cause the first gear 570 to be driven for rotation by the odd layshaft 520. Once that preselected maximum rotational speed is exceeded, the one-way clutch bearings 596 are allowed to free-wheel between the race portion 598 of the one-way clutch 594 and the odd layshaft 520. The first gear 570 is no longer driven for rotation by the odd layshaft 520, thereby permitting other gears on the odd layshaft 520, such as third gear 574 and fifth gear 578, to be selectively driven for rotation by the odd layshaft 520 and other gear pinions on the even layshaft 522, such as second gear pinion 582 and fourth gear pinion 576, to be driven for rotation.

Turning now to more of the details of the dual clutch transmission mechanism 500 illustrated in FIGS. 14 and 15, a pair of clutch systems 560 and 562 are provided to selectively transfer torque from an engine input shaft 524 to an odd layshaft 520 and an even layshaft 522 each having a plurality of gear pinions selectively engageable therewith to be driven for rotation. More specifically, on the upstream side of the clutch systems 560 and 562, the engine input shaft 524 drives an engine input sprocket 528 for rotation. A damper 530 is disposed between the engine input shaft 524 and the engine input sprocket 528 for absorbing vibrations. Also on the upstream side of the clutches 560 and 562, an odd clutch drive sprocket 542 is connected to the input side of the odd clutch 560 and an even clutch drive sprocket 544 is connected to the input side of the even clutch 562. The odd clutch drive sprocket 542 and the even clutch drive sprocket 544 are simultaneously driven for rotation by the engine input sprocket 528, such as by a chain, gears or a combination thereof, as discussed above with reference to FIGS. 1 and 4-12.

On the downstream side of the clutches 560 and 562, the output side of the odd clutch 560 is engaged with the odd layshaft 520 and the output side of the even clutch 562 is engaged with the even layshaft 522. Odd gear pinions are positioned axially along the odd layshaft 520, in this example a first gear pinion 570, third gear pinion 574 and fifth gear pinion 578. Even gear pinions are positioned axially along the even layshaft 522, in this example a second gear pinion 572 and fourth gear pinion 576. In addition, a synchronizer-operated reverse gear pinion 582 is positioned on the even layshaft 522.

Each of the gear pinions 570, 572, 576, 574, 578 and 582 is selectively engageable with its respective layshaft 520 or 522 to be driven for rotation thereby. As discussed above in greater detail, the first gear pinion 570 is selectively engageable with the odd layshaft 520 by the one-way clutch 594 to be driven for rotation thereby when the engine input sprocket 528 is driven for rotation at certain predetermined rotational speeds. Synchronizers 120, and preferably single cone synchronizers, are used to engage the other gear pinions 572, 576, 574, 578 and 582 with their respective layshafts 520 or 522 to be driven for rotation thereby. More specifically, one synchronizer 120 is positioned on the odd layshaft 520 and selectively can engage either the third gear pinion 574 or the fifth gear pinion 578 for rotation with the odd layshaft 520. Two synchronizers 120 are positioned on the even layshaft 522, one to selectively engage the reverse gear pinion 582 for rotation with the even layshaft 522 and the other to selectively engage either the second gear pinion 572 or the fourth gear pinion 576 for rotation with the even layshaft 522.

A countershaft 550 is non-coaxial and spaced from the odd layshaft 520 and the even layshaft 522. The countershaft 550 has a plurality of driven gears 552, 554 and 556 mounted thereon for rotation therewith. The plurality of driven gears 552, 554 and 556 mounted on the countershaft 550 are each driven for rotation by one or more of the first gear pinion 570, second gear pinion 572, third gear pinion 574, fourth gear pinion 576 and fifth gear pinion 578 when the gear pinions are engaged for rotation with the respective odd layshaft 520 or even layshaft 522. The reverse gear pinion 582 of the even layshaft drives one of the plurality of driven gears 552, 554 and 556 on the countershaft 550 via an intermediate idler gear 590 mounted for rotation about an idler gear shaft 592. However, there is not necessarily a separate driven gear 552, 554 and 556 on the countershaft 550 for each of the gear pinions 570, 572, 574, 576, 578 and 582.

Instead, one or more of the driven gears 552, 554 and 556 on the countershaft 550 is shared by one or more of the gear pinions 570, 572, 574, 576, 578 and 582 on the odd layshaft 520 and the even layshaft 522. For example, first gear pinion 578 may drive a corresponding first driven gear 552; second gear pinion 572, third gear pinion 574 and reverse gear pinion 582 (via the idler gear 590) may drive a corresponding common second/third/reverse driven gear 554; and fourth gear pinion 576 and fifth gear pinion 578 may drive a corresponding common fourth/fifth driven gear 556. An output gear 532 is driven for rotation by the fourth/fifth driven gear 556 of the countershaft 550, and in turn drives a transaxle 536 having a differential 534.

The dual clutch transmission mechanism 500 incorporates a gear ratio both upstream and downstream of the clutches 560 and 562. More specifically, the upstream gear ratio for first, third and fifth gears is the ratio between the odd clutch drive sprocket 542 and the engine input sprocket 528 and upstream gear ratio for the second, fourth and reverse gears is the ratio between the even clutch drive sprocket 544 and the engine input sprocket 528. The downstream gear ratio for first gear is the ratio between first gear pinion 570 and the first driven gear 552, for second gear is the ratio between second gear pinion 572 and the second/third/reverse driven gear 554, for third gear is the ratio between third gear pinion 574 and the second/third reverse driven gear 554, for reverse gear is the ratio between the reverse gear pinion 582 and the second/third/reverse driven gear 554, for fourth gear is the ratio between the fourth gear pinion 576 and the fourth/fifth driven gear 556, and for fifth gear is the ratio between the fifth gear pinion 578 and the fourth/fifth driven gear 556. The effective gear ratio is the multiple of the upstream gear ratio and the downstream gear ratio for a given gear. By having both the upstream gear ratio and the downstream gear ratio, some or all of the benefits set forth in detail above can be achieved.

EXAMPLE

An illustration of the advantages of some of the aspects of the dual clutch transmission disclosed herein may be shown by selecting sprocket, pinion and gear configurations such as those below for use in the dual clutch transmission mechanism 500 having five forward speeds and a reverse speed is set forth below based upon the number of teeth on each sprocket 528, 542, 544, gear 552, 554 and 556 or pinion 570, 572, 574, 576, 578 and 582:

| Gear/Sprocket | Teeth |
| --- | --- |
| Input Sprocket (528) | 24 |
| Odd Input Sprocket (542) | 42 |
| Even Input Sprocket (544) | 56 |
| First (570) | 17 |
| Second (572) | 29 |
| Third (574) | 31 |
| Fourth (576) | 39 |
| Fifth (578) | 38 |
| Reverse (582) | 19 |
| First Driven (552) | 39 |
| Second/Third/Reverse Driven (554) | 27 |
| Fourth/Fifth Driven (578) | 17 |

For this example, the upstream gear ratios (the ratio between the odd clutch drive sprocket 542 or the even clutch drive sprocket 544 and the engine input sprocket 528), downstream gear ratios (the ratio between the gear pinions 570, 572, 574, 576, 578 and 582 located on the odd layshaft 520 and the even layshaft 522 and the driven gears 552, 554 and 556 mounted on the countershaft 550) and effective gear ratios at the countershaft may be calculated as follows:

| Gear | Engine Input - Clutch Drive Gear Ratio | Layshaft Pinion - Countershaft Gear Ratio | Effective Ratio |
| --- | --- | --- | --- |
| First | 1.75 | 2.29 | 4.01 |
| Second | 2.33 | 0.93 | 2.17 |
| Third | 1.75 | 0.87 | 1.52 |
| Fourth | 2.33 | 0.44 | 1.02 |
| Fifth | 1.75 | 0.45 | 0.78 |
| Reverse | 2.33 | 1.42 | 3.31 |

As shown by this example, both the upstream and downstream gear ratios are much less than the effective gear ratios at the countershaft using the above assumed sprocket, pinion and gear configurations. Thus, some or all of the benefits set forth in detail above can be achieved. Similar reductions in the upstream and downstream gear ratios can be attained with other sprocket or gear, pinion and countershaft gear configurations, with similar benefits, and at other effective gear ratios.

Other aspects of the operation of dual clutch mechanism disclosed herein can be illustrated by comparison with conventional dual clutch transmissions. For example, in a conventional dual clutch transmission, the relationship between the engine input rotational speed and the first, odd layshaft speed when the first, odd clutch is engaged can be expressed as $R_{L1}=R_E$, where $R_{L1}$ is the rotational speed of first layshaft, and $R_E$ is the rotational speed of the engine input. Similarly, the relationship between the engine input rotational speed and the second, even layshaft speed when the second, even clutch is engaged be expressed as $R_{L2}=R_E$, where $R_{L2}$ is the rotational speed of the second layshaft. In practice, $R_{L1}$ and $R_{L2}$ may actually be somewhat less than $R_E$ due to clutch slippage, drag forces or other factors that may reduce the efficiency of the transfer of rotational speed between the engine input and layshafts.

The relationship between the engine input rotational speed and the speed of the countershaft in a conventional dual clutch system at a selected gear with the clutch and layshaft engaged (subject to the above mentioned transfer inefficiencies) also can be expressed as $R_C=(R_E)(r_n)$, where $R_C$ is the rotational speed of countershaft and $r_n$ is the gear ratio between the selected pair of layshaft pinions and countershaft gears, and n is the number of the selected gear (i.e., $1^{st}$ gear, $2^{nd}$ gear, etc.).

In the transmission mechanisms disclosed herein, such as the transmission 500, the relationship between the countershaft rotational speed and the engine input for the odd gears can be expressed as $R_{Codd}=(R_E)(r_{nodd})(r_{L1})$, and countershaft rotational speed for the even gears and reverse gear can be expressed $R_{Ceven}=(R_E)(r_{neven})(r_{L2})$. In these expressions, $r_{L1}$ is the gear ratio between the engine input sprocket 528 and the first, odd clutch drive sprocket 42 and $r_{L2}$ is the gear ratio between the engine input sprocket 528 and the second, even clutch drive sprocket 44.

Thus, from these relationships the effect of the combination of the upstream and down stream gear ratios on the reduction of the rotational speed of the clutch systems 560, 562 and thus the layshafts 520, 522, as discussed above can be demonstrated. For example, the below table sets forth a range of typical engine input shaft 526 speeds, expressed in revolutions per minute (RPM), for the different gears of the transmission mechanism 500 of FIGS. 14-16 as indicated above and the resultant estimated RPM range of the clutch systems 560, 562 and the layshafts 520, 522, which is compared with estimated speeds of a typical, conventional dual clutch transmission system. The speed range for and engine input shaft in many applications is typically from about 800 to 7700 rpms, and the typical operating range for may applications is from about 1000 to 4000 rpms.

| Gear | Effective Gear Ratio | Typical RPM Range of Engine Input Shaft | Approx. RPM Layshafts for Conventional Transmission Systems | Approx. Counter-shaft RPM for Conventional Transmission Systems |
|---|---|---|---|---|
| First | 4.01 | 1000-4000 | 1000-4000 | 249-998 |
| Second | 2.17 | 1000-4000 | 1000-4000 | 461-1843 |
| Third | 1.52 | 1000-4000 | 1000-4000 | 658-2632 |
| Fourth | 1.02 | 1000-4000 | 1000-4000 | 980-3922 |
| Fifth | 0.78 | 1000-4000 | 1000-4000 | 1282-5128 |
| Reverse | 3.31 | 1000-4000 | 1000-4000 | 302-1208 |

| Gear | Engine Input RPM Range | Engine Input - Clutch Drive Gear Ratio | Approx. Layshaft RPM | Layshaft Pinion - Countershaft Gear Ratio | Approx. Countershaft RPM | Percent Reduction In Layshaft RPM |
|---|---|---|---|---|---|---|
| First | 1000-4000 | 1.75 | 571-2286 | 2.29 | 249-998 | 57% |
| Second | 1000-4000 | 2.33 | 429-1717 | 0.93 | 461-1843 | 43% |
| Third | 1000-4000 | 1.75 | 571-2286 | 0.87 | 658-2632 | 57% |
| Fourth | 1000-4000 | 2.33 | 429-1717 | 0.44 | 980-3922 | 43% |
| Fifth | 1000-4000 | 1.75 | 571-2286 | 0.45 | 1282-5128 | 57% |
| Rev. | 1000-4000 | 2.33 | 429-1717 | 1.42 | 302-1208 | 43% |

As can be seen by this comparison, the clutch systems 560, 562 and layshafts 520, 522 of the transmission mechanism 500 of FIGS. 14-16 of the example rotate at significantly reduced speeds as compared to typical conventional dual clutch transmission systems, thus permitting some or all of the benefits of reduced rotations speeds, such as reduced clutch drag and reduced clutch self-apply forces, to be realized and taken advantage of in designing the transmission mechanism 500 for particular applications.

The example also can illustrate the significant reduction in the self-apply force and clutch drag torque experienced by the clutches of the transmission systems disclosed herein. The self-apply force is a function of the rotational speed of the clutch, which can be expressed as Self-Apply Force=f($R_{clutch}^2$), where $R_{clutch}$ is the rotational speed of the first odd, or second, even clutch (which also is approximately the same as $R_{L1}$ or $R_{L2}$ as discussed above). Accordingly, reducing the clutch rotational speed by a factor of 1.75 at the high end of the rotational speeds of the example in first gear, would result in a reduction by a factor of $1.75^2$, or 67% of the clutch self apply force relative to conventional systems (all other variables remaining constant). Similarly, reducing the clutch rotational speed by a factor of 1.75 at the high end of the rotational speeds of the example in fifth gear, would result in a reduction by a factor of $1.75^2$, or 67% relative to conventional systems. The even gears in this example would have clutch self apply force that is reduced by $2.33^2$, or by 82%.

Thus, the compensating clutch balance force required to offset that self apply force, which must compensate for the greatest self apply forces, can be proportionately reduced. As discussed above, this permits the reduction of the complexity of design, parts and operation of the clutch systems for the transmission mechanism disclosed herein through the use of balance springs with reduced spring force or constants.

Clutch drag, $D_{clutch}$, is a function of several factors relating to the clutch construction and materials, oil flow, clutch operating conditions, and other such factors. The relationship between clutch rotational speed and clutch drag can be expressed as $D_{clutch}=f(R_{clutch},q)$, where q=oil flow rate. Accordingly, a reduction in clutch rotational speed by a factor of 1.75 at the high end of the rotational speeds of the example in first gear, would result in a reduction of the clutch drag by about 43% relative to conventional systems (all other variables remaining constant). Similarly, reducing the clutch rotational by a factor of 1.75 at the high end of the rotational speeds of the example in fifth gear, would result in a reduction by 43% relative to conventional systems. Similarly, the clutch drag of the even clutch would be reduced by a factor of 2.33, which is about a 57% reduction.

The example above also may be used to illustrate the benefits of deploying synchronizers on the layshafts of the transmission mechanism disclosed herein, rather than on the countershaft as in conventional systems. The synchronizer torque capacity required in a system such as the transmission mechanism 500 is a function of several variables which will depend on the specific construction and operation of the system. The relationship between several important variables can be expressed as Synchronizer Torque Capacity=f(I, $w^2$, t, D). Where w=differential speed between the gear or pinion and the respective shaft (countershaft or layshaft); I=rotational inertia that the synchronizer must overcome; t=the desired synchronizing time; and D=system drag.

As discussed above, in conventional dual clutch transmission systems where the first gear synchronizer is mounted on the countershaft, the rotational inertia reflected back from the layshaft is a function of the square of the gear ratio or $r_n^2$. Accordingly the torque capacity required of the synchronizer can be reduced by a proportionate amount relative to conventional systems in the aspects of the transmission mechanisms disclosed herein where the synchronizer is deployed on a layshaft, such as the first, odd layshaft. In the above example, the gear ratio for first gear is $r_{1st}$=4.01, and thus the required first gear synchronizer torque capacity would be decreased by a factor $4.01^2$ or 16.08, relative to conventional systems. For the reverse gear of the example with a gear ratio of $r_{reverse}$=3.31, employing the synchronizer on the corresponding layshaft permits a reduction of the synchronizer torque capacity by a factor of $3.31^2$ or 10.96.

In a similar fashion, the clutch drag torque, $D_{clutch}$, for the clutch system of each layshaft in conventional systems is reflected through the gear ratio between the intermeshed layshaft pinions and countershaft gears. The synchronizer torque capacity to compensate for $D_{clutch}$, in such conventional systems therefore also is increased by a factor of $r_n$. In the aspects of the transmission mechanism herein employing a synchronizer on the layshafts, the reduction in the synchronizer torque capacity necessary to compensate for $D_{clutch}$ can be reduced by a factor of $r_n$, relative to the conventional systems, which in the above example for first gear is a factor of 4.01.

Suitable diameters for the pinions ($D_P$) and gears ($D_G$) in the above example can be determined by the desired ratio between the pinions and gears ($r_n$). For example, for a given gear diameter for first gear ($D_{G1}$), the corresponding diameter of the first gear pinion ($D_{P1}$) is determined by the following formula: $D_{P1}=D_{G1}/r_1$. In the above example where the desired effective gear ratio is 4.01, the first gear ratio is 2.29, that is, where the first gear pinion rotates 2.29 times for each rotation of the first gear, the diameter of the first gear pinion $D_{P1}$ is determined by $D_{G1}/2.29$, or about 40% (about ⅖) of the diameter of the first gear. In prior transmission systems lacking an upstream gear ratio, the effective gear ratio is determined entirely by the gear ratio between the pinion and gear. For comparison purposes, to achieve a gear ratio of 4.01 for first gear, the pinion would have to have a diameter that is about 25% of the diameter of the corresponding first gear.

Thus, the presently disclosed transmission mechanism having an upstream gear ratio and a downstream gear ratio can have the above-discussed benefit of having a first gear pinion, and other pinions, that has a larger diameter as compared to the diameter of such a pinion in prior transmission systems. For instance, the larger first gear pinion permits of the present transmission mechanism permits a bearing to be inserted between the pinion and the corresponding layshaft, which in turn permits a synchronizer to be mounted on the layshaft to select that pinion for driving rotation.

As discussed above with respect to the descriptions of FIG. 1, a single chain 40 may be used to simultaneously drive the odd clutch drive sprocket 542 and the even clutch drive sprocket 544 using the engine input sprocket 528. One example of a suitable chain for use in the dual clutch transmission mechanism 500 of EXAMPLE 1 has 94 links, is about 20 mm wide, and has a pitch of about 8 mm. In this example, the center of the odd clutch input sprocket 542 is spaced about 108 mm from the center of the engine input sprocket 528, the center of the even input sprocket 544 is spaced about 218 mm from the center of the engine input sprocket 528 and the center of the even clutch drive sprocket 544 is spaced about 128 mm from the center of the odd clutch drive sprocket 542.

Figure 18:
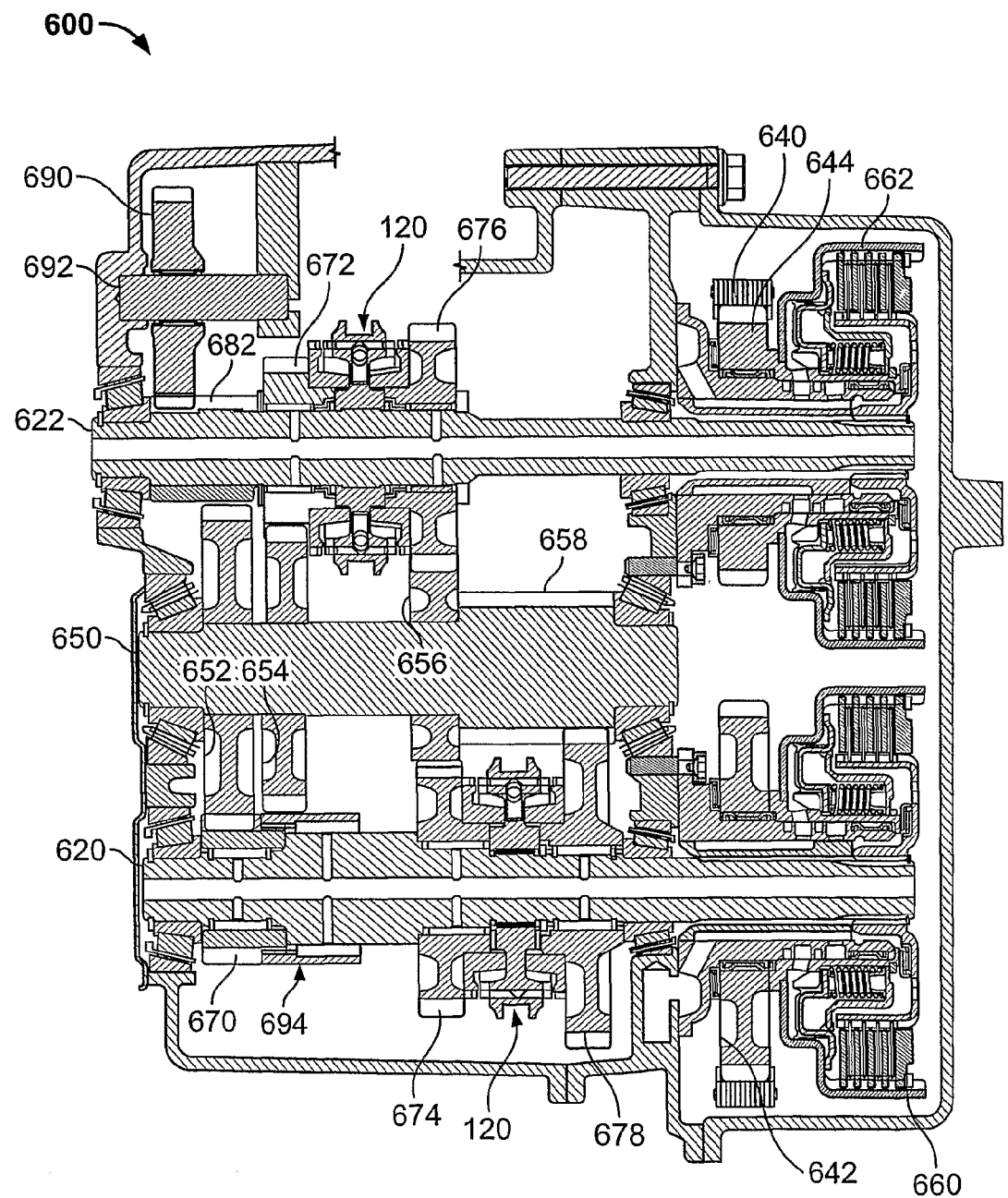
FIG. 18 is cross-sectional view of a configuration of a dual clutch transmission mechanism having five speeds and showing a first or odd layshaft, a second or even layshaft and a countershaft, a one way clutch-operated first gear pinion and a sliding reverse idler gear.
Figure 19:
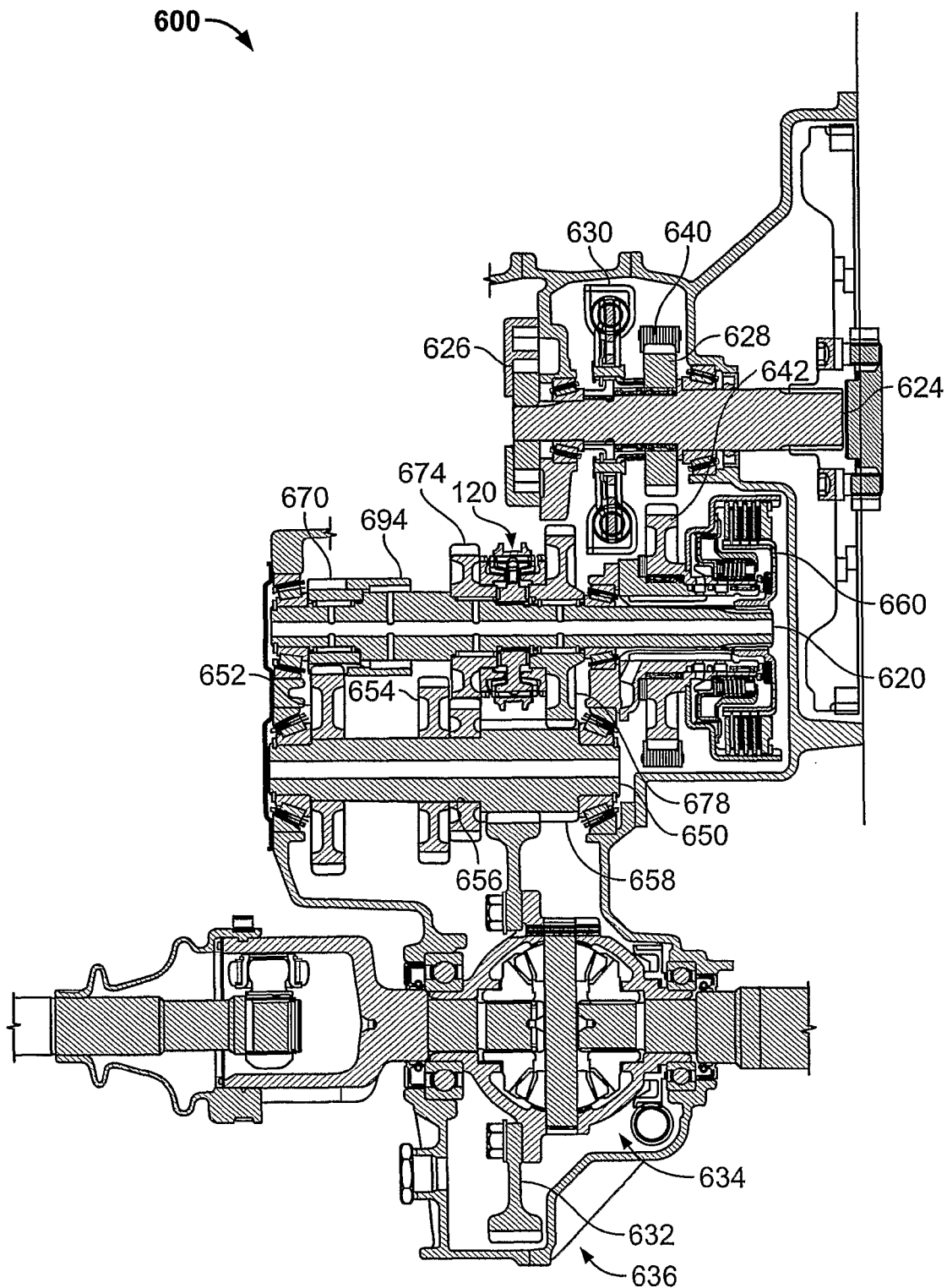
FIG. 19 is a cross-sectional view of the configuration of the dual clutch transmission mechanism of FIG. 18 and showing an engine input shaft, the countershaft, and the first or odd layshaft, an internal damper and a differential system.

Another example of a configuration of a dual clutch transmission mechanism 600 is illustrated in FIGS. 18 and 19. This transmission mechanism is similar in construction to the transmission mechanism of FIGS. 14-16, but primarily differs in that it has a sliding reverse gear idler 692 instead of being synchronizer-operated. The reduction of the number of synchronizers 120 can reduce the cost of the transmission mechanism 600. Other differences will be apparent from the discussion herein.

The transmission mechanism 600 has an engine input shaft 624, an odd layshaft 620, and even layshaft 622 and a countershaft 650. The axes of each of these shafts 624, 620, 622 and 650 are non-coaxial and parallel with one another. An odd clutch system 660 and an even clutch system 662 are provided and are each separately engageable for purposes that will be discussed in greater detail.

On the upstream side of the clutch systems 660, 662, a chain 640 drives an odd clutch drive sprocket 642 and an even clutch drive sprocket 44 for rotation via an engine input sprocket 628 mounted to the engine input shaft 624. The ratio between the odd clutch drive sprocket 642 and the engine input sprocket 628 is different than the ratio between the even clutch drive sprocket 644 and the engine input sprocket 628. The drive or upstream side of the odd clutch system 660 is operatively connected to the odd clutch drive sprocket 642 and is driven for rotation thereby. Similarly, the drive or upstream side of the even clutch system 662 is operatively connected to the even clutch drive sprocket 644 and is driven for rotation thereby.

Turning now to the downstream side of the clutch systems 660, 662, the downstream or output side of the odd clutch system 660 is operatively connected to the odd layshaft 620 and the downstream or output side of the even clutch system 662 is operatively connected to the even layshaft 622. When the odd clutch system 660 is engaged, torque is transmitted from the odd clutch drive sprocket 642, through the odd clutch system 660, and to the odd layshaft 620. Similarly, when the even clutch system 662 is engaged, torque is transmitted from the even clutch drive sprocket 644, through the even clutch system 662, and to the even layshaft 662.

Located on the odd layshaft 620 is a first gear pinion 670, a third gear pinion 674 and a fifth gear pinion 678. A one-way clutch 694 is positioned to engage the first gear pinion 670 for rotation with the odd layshaft 620. A synchronizer 120 is located on the odd layshaft 620 and is positioned between the third gear pinion 674 and the fifth gear pinion 678 for selective engagement of the pinion 674 or 678 with the odd layshaft 620. Located on the even layshaft 622 is a second gear pinion 672, a fourth gear pinion 676 and a reverse gear pinion 682. A synchronizer 120 is located on the even layshaft 622 and is positioned between the second gear pinion 672 and the fourth gear pinion 676 to selectively engage one of the pinions 672 or 676 with the even layshaft 622 for rotation therewith. The reverse gear pinion 682 is mounted to the even layshaft 622. A reverse gear idler 690 is rotatable about an idler shaft 692. The reverse gear idler 690 is selectively slidable along the reverse gear pinion 682 between a first position and a second position. The reverse gear idler 690 may be slid between the first position and the second position in a variety of manners, including via a hydraulically, mechanically or electronically actuated fork or lever arm (not shown).

The countershaft 650 has a first/reverse driven gear 652, a second driven gear 654, a third/fourth driven gear 656 and a fifth driven gear 658. The first/reverse driven gear 652 is aligned with first gear pinion 670 and the reverse idler gear 690 when the reverse idler gear is in the second position. The first/reverse driven gear 652 is not aligned with the reverse idler gear 690 when the reverse idler gear is in the first position. The second driven gear 654 is aligned with the second gear pinion 672, the third/fourth driven gear 656 is aligned with the third gear pinion 674 and the fourth gear pinion 676, and the fifth driven gear 658 is aligned with the fifth gear pinion 678. The fifth driven gear 658 also functions as a final drive gear, and is aligned with an output gear 632, which in turn is coupled to the housing of a differential system 634 and drives the same for rotation.

Different downstream gear ratios are present between the various gear pinions 670, 672, 674, 676, 678 and 682 of the layshafts 620, 622 and the aligned driven gears 652, 654, 656 and 658 of the countershaft 650. The gear ratio is determined by which of the clutch systems 660, 662 is engaged to drive which of the layshafts 620, 622, and which of the gear pinions 672, 674, 676, 678 and 682 is engaged with the respective layshaft 620, 622. The product of these downstream gear ratios and the upstream gear ratios results in a total effective gear ratio for the transmission mechanism 600 dependent upon which gear, i.e., first, second, third, fourth, fifth, or reverse, is selected.

Figure 20:
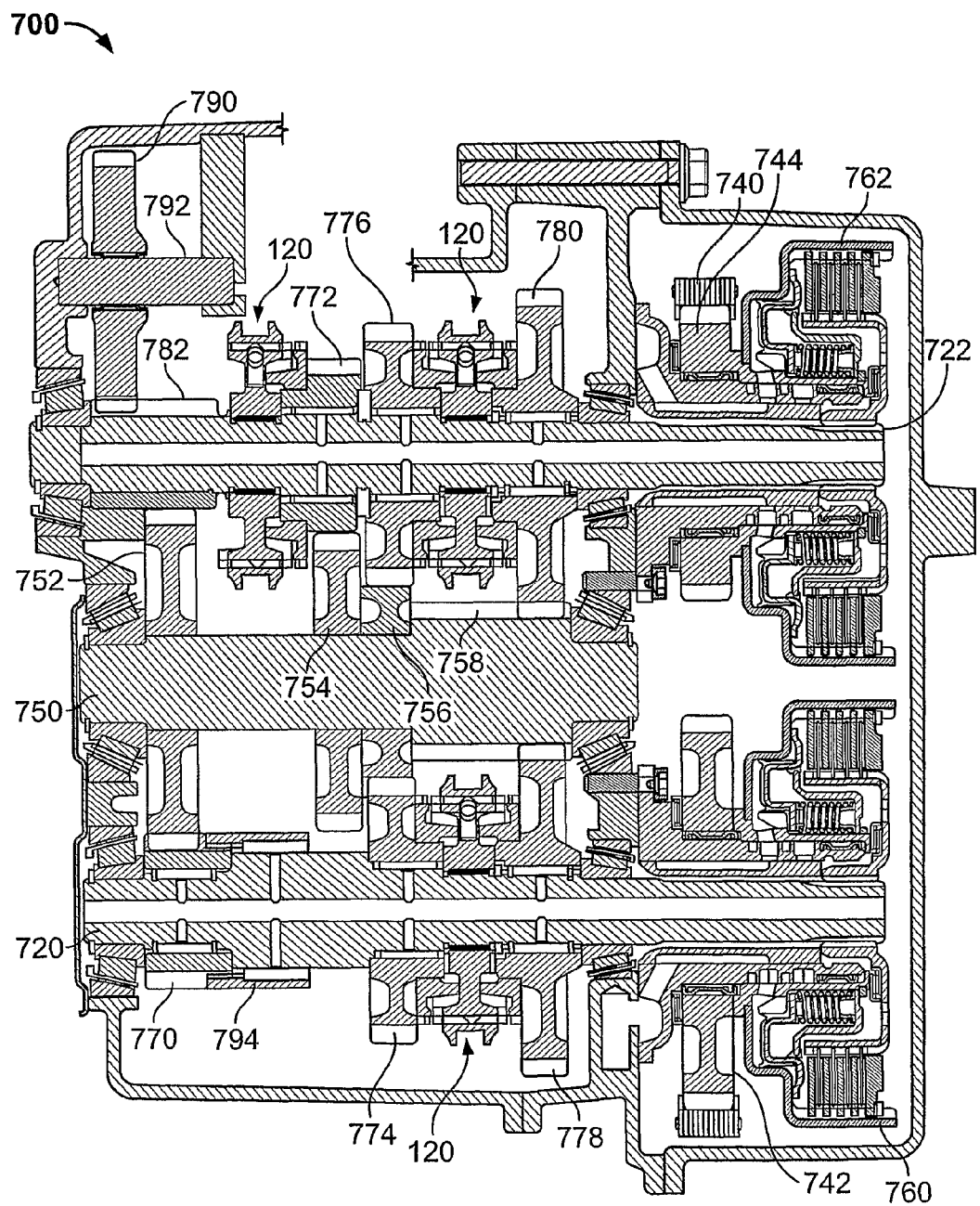
FIG. 20 is a cross-sectional view of a configuration of a dual clutch transmission mechanism having six speeds and showing a first or odd layshaft, a second or even layshaft and a countershaft, a one way clutch between the first or odd layshaft and a first gear pinion and a sliding reverse idler gear.

In another example, illustrated in FIG. 20, a dual clutch transmission mechanism 700 is disclosed that has six forward speeds and a reverse speed that is activated via a sliding reverse idler gear 790. The transmission mechanism 700 includes an odd clutch system 760 and an even clutch system 762, the functions of which will be described in greater detail. On the upstream side of the clutch systems 760, 762, an engine input sprocket (not shown) drives both an odd clutch drive sprocket 742 and an even clutch drive sprocket 744 for rotation via a chain 740. The odd clutch drive sprocket 742 is operably connected to drive the input side of the odd clutch system 760, and the even clutch drive sprocket 744 is operably connected to drive the input side of the even clutch system 762. The ratio between the engine input sprocket and the odd clutch drive sprocket 742 is different than the ratio between the engine input sprocket and the even clutch drive sprocket 744.

On the downstream side of the clutch systems 760, 762, an odd layshaft 720 is driven for rotation by the output side of the odd clutch system 760 and an input layshaft 722. A first gear pinion 770, a third gear pinion 774 and a fifth gear pinion 778 are located on the odd layshaft 720. A one-way clutch 794, having a construction and operation similar to that described above with respect to the transmission mechanism 500 of FIGS. 14-16, selectively engages the first gear pinion 770 for rotation with the odd layshaft 720. A synchronizer 120 is located on the odd layshaft 720 and is positioned between the third gear pinion 774 and the fifth gear pinion 778 for selectively engaging one of these pinions 774 and 778 for rotation with the odd layshaft 720. A second gear pinion 772, a fourth gear pinion 776 and a sixth gear pinion 780 are located on the even layshaft 722.

A synchronizer 120 is located on the even layshaft 722 and selectively can engage the second gear pinion 772 with the even layshaft 722 for rotation therewith. Another synchronizer 120 is also located on the even layshaft 722 and is positioned between the fourth gear pinion 776 and the sixth gear pinion 780 for selectively engaging one of these pinions 776 and 780 for rotation with the even layshaft 722. A reverse gear pinion 782 is integrally formed with the even layshaft 722 and is intermeshed with the reverse idler gear 790 which is adapted to rotate about an idler shaft 792. The length of the reverse gear pinion 782 is larger than that of the width of the reverse idler gear 790 such that the gear 790 can be slid, such as using the means set forth above with respect to the transmission mechanism 600 of FIGS. 18 and 19, from a first position to a second position, as will be described in further detail.

A countershaft 750 is orientated parallel to and spaced from the odd and even layshafts 720, 722. A first/reverse gear 752, second gear 754, third/fourth gear 756 and fifth/sixth gear 758 are mounted to the countershaft 750. The first/reverse gear 752 is aligned to be driven by the first gear pinion 770 or the reverse idler gear 790 in the second position, but not the first position. The second gear 754 is aligned to be driven by the second gear pinion 772. The third/fourth gear 756 is aligned to be driven by either the third gear pinion 774, when the odd clutch system 760 is engaged to rotate the odd layshaft 720, or the fourth gear pinion 776, when the even clutch system 762 is engaged to rotate the even layshaft 722. The fifth/sixth gear 758, which also functions as the final drive gear, is aligned to be driven by either the fifth gear pinion 778, when the odd clutch system 760 is engaged to rotate the odd layshaft 720, or the sixth gear pinion 780, when the even clutch system 762 is engaged to rotate the even layshaft 722.

Each of the combinations of the gears 752, 754, 756 and 758 of the countershaft 750 and the pinions 770, 772, 774, 776, 778, 780 and 782 have a different downstream gear ratio. The downstream gear ratio is multiplied by with the upstream sprocket ratio, between either the engine input sprocket and the odd clutch drive sprocket 742 for the odd gears or the engine input sprocket and the even clutch drive sprocket 744 for the even and reverse gears, to produce an effective gear ratio of the transmission mechanism 700.

Figure 21:
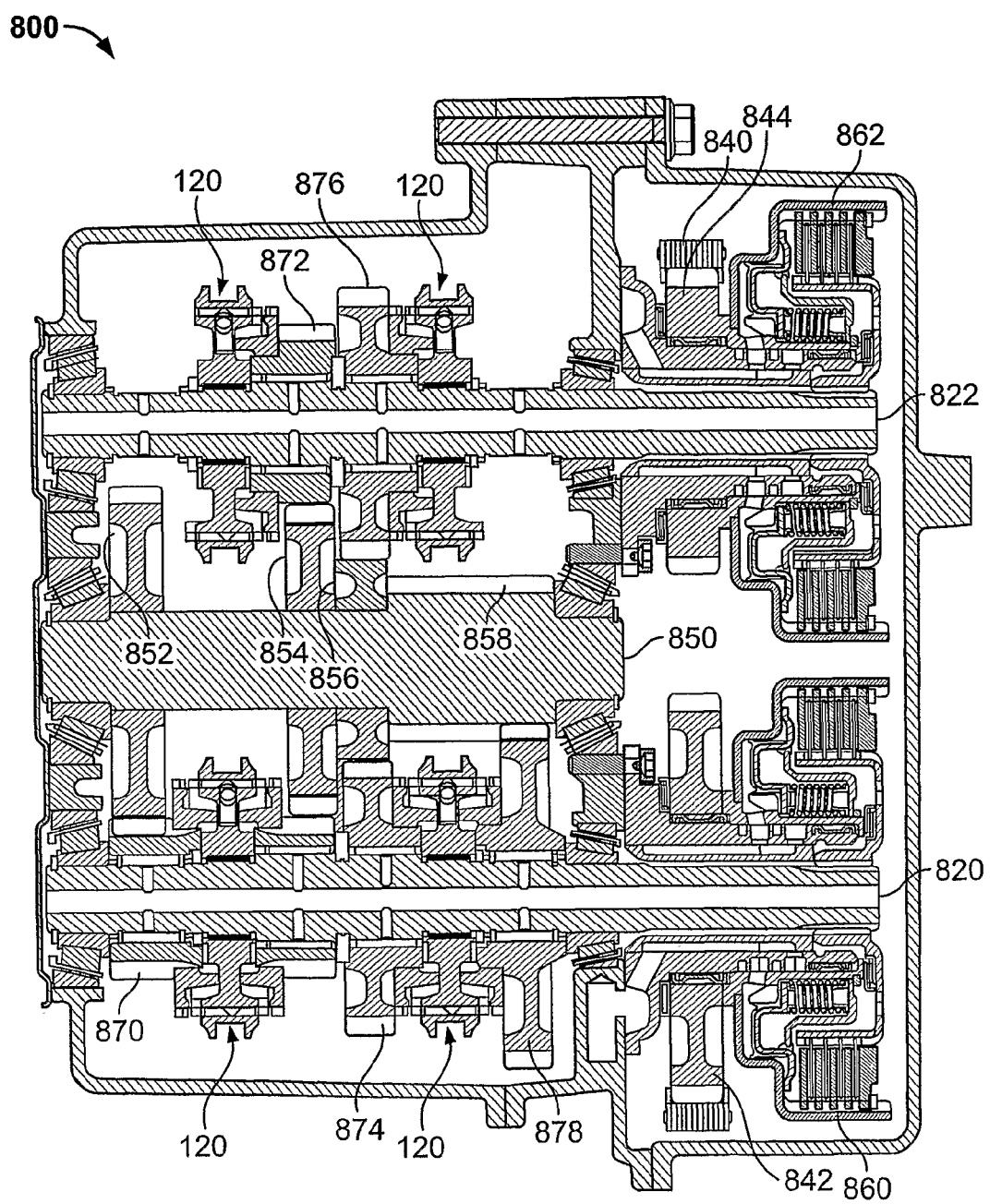
FIG. 21 is a cross-sectional view of a configuration of a dual clutch transmission mechanism having five speeds and showing a first or odd layshaft, a second or even layshaft and a countershaft, a synchronizer-operated first gear pinion and a synchronizer-operated reverse gear pinion.

In yet another example, illustrated in FIG. 21, a dual clutch transmission mechanism 800 is provided that has five forward speeds and a synchronizer-operated reverse gear and first gear. The transmission mechanism 800 includes an odd clutch system 860 and an even clutch system 862, the functions of which will be described in greater detail. On the upstream side of the clutch systems 860, 862, an engine input sprocket (not shown) drives both an odd clutch drive sprocket 842 and an even clutch drive sprocket 844 for rotation via a chain 840. The odd clutch drive sprocket 842 is operably connected to drive the input side of the odd clutch system 860, and the even clutch drive sprocket 844 is operably connected to drive the input side of the even clutch system 862. The ratio between the engine input sprocket and the odd clutch drive sprocket 842 is different than the ratio between the engine input sprocket and the even clutch drive input sprocket 844.

On the downstream side of the clutch systems 860, 862, an odd layshaft 820 is driven for rotation by the output side of the odd clutch system 860 and an input layshaft 822. A first gear pinion 870, a reverse gear pinion 882, a third gear pinion 874 and a fifth gear pinion 878 are located on the odd layshaft 820. A synchronizer 120 is located on the odd layshaft 820 and is positioned between the first gear pinion 870 and the reverse gear pinion 882 for selectively engaging one of the pinions 870 and 882 with the odd layshaft 820. Another synchronizer 120 is located on the odd layshaft 820 and between the third gear pinion 874 and the fifth gear pinion 878 for selectively engaging one of these pinions 874 and 878 for rotation with the odd layshaft 820. A second gear pinion 872 and a fourth gear pinion 876 are located on the even layshaft 822 and have a synchronizer 120 therebetween that can selectively engage the second gear pinion 872 or the fourth gear pinion 876 with the even layshaft 822 for rotation therewith.

A countershaft 850 is orientated parallel to and spaced from the odd and even layshafts 820, 822. A first gear 852, second/reverse gear 854, third/fourth gear 856 and fifth gear 858 are mounted to the countershaft 850. The first gear 852 is aligned to be driven by the first gear pinion 870. The second/reverse gear 854 is aligned to be driven by the second gear pinion 872 or the reverse gear pinion 882 via a reverse idler gear (not shown). The third/fourth gear 856 is aligned to be driven by either the third gear pinion 874, when the odd clutch system 860 is engaged to rotate the odd layshaft 820, or the fourth gear pinion 876, when the even clutch system 862 is engaged to rotate the even layshaft 822. The fifth gear 858, which also functions as the final drive gear, is aligned to be driven by the fifth gear pinion 878.

Each of the combinations of the gears 852, 854, 856 and 858 of the countershaft 850 and the pinions 870, 872, 874, 876, 878 and 882 have a different downstream gear ratio. The downstream gear ratio is multiplied by with the upstream sprocket ratio, between either the engine input sprocket and the odd clutch drive sprocket 842 for the odd gears or the input sprocket and the even clutch drive sprocket 844 for the even and reverse gears, to produce an effective gear ratio of the transmission mechanism 800.

Figure 22:
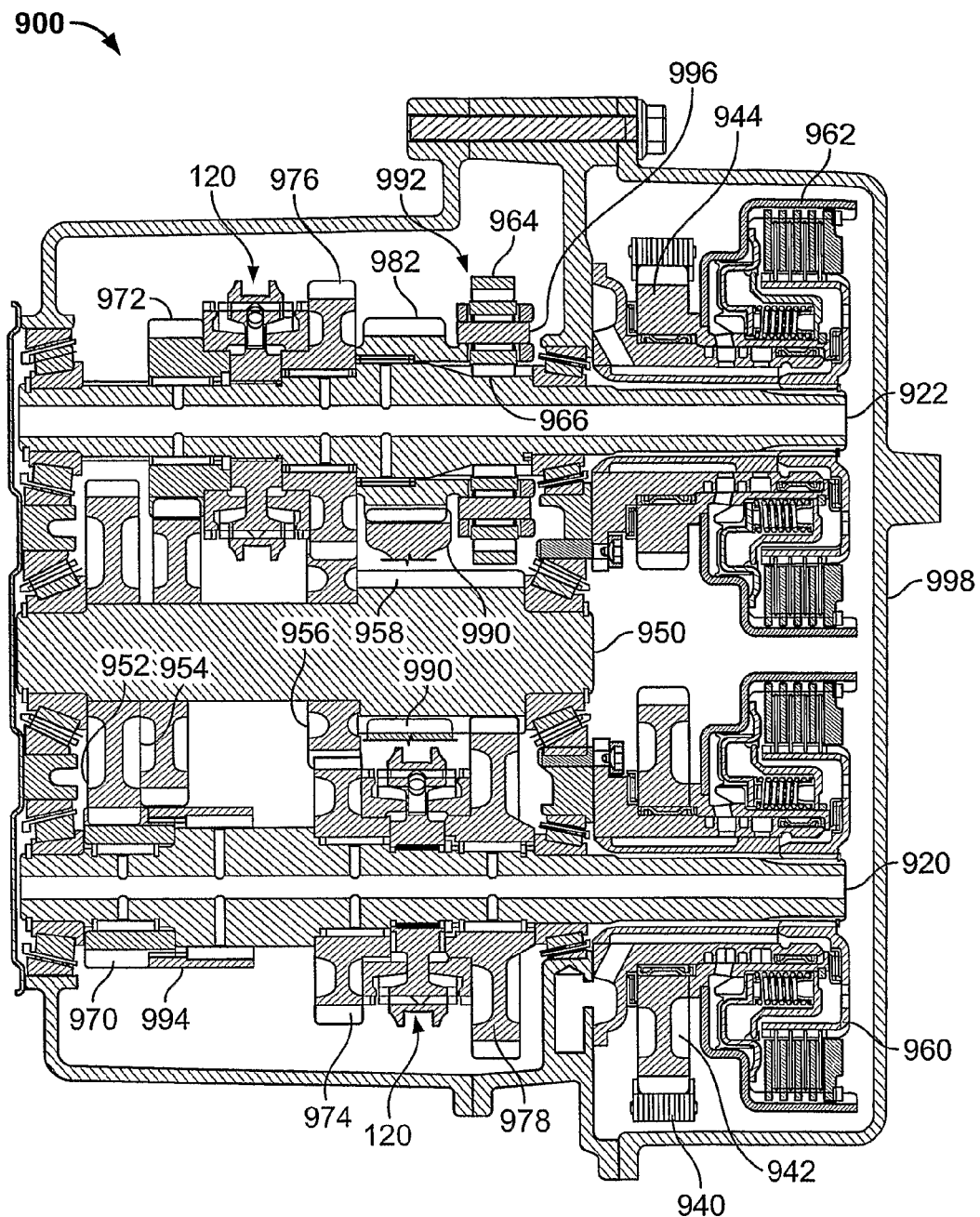
FIG. 22 is a cross-sectional view of a configuration of a dual clutch transmission mechanism having five speeds and showing a first or odd layshaft, a second or even layshaft and a countershaft, a planetary-operated reverse gear and a one way clutch between the first or odd layshaft and the first gear pinion.

In another example, illustrated in FIG. 22, a transmission mechanism 900 is disclosed that has five forward speeds and a reverse speed. The transmission mechanism 900 further has a one-way clutch 994 associated with a first gear pinion 970 and a planetary gear system 992 associated with a reverse gear pinion 982, as will be discussed in greater detail. The transmission mechanism 900 includes an odd clutch system 960 and an even clutch system 962, the functions of which will be described in greater detail. On the upstream side of the clutch systems 960, 962, an engine input sprocket (not shown) drives both an odd clutch drive sprocket 942 and an even clutch drive sprocket 944 for rotation via a chain 940. The odd clutch drive sprocket 942 is operably connected to drive the input side of the odd clutch system 960, and the even clutch drive sprocket 944 is operably connected to drive the input side of the even clutch system 962. The ratio between the engine sprocket and the odd clutch drive sprocket 942 is different than the ratio between the engine input sprocket and the even clutch drive input sprocket 944.

On the downstream side of the clutch systems 960, 962, an odd layshaft 920 is driven for rotation by the output side of the odd clutch system 960 and an input layshaft 922. The first gear pinion 970, a third gear pinion 974 and a fifth gear pinion 978 are located on the odd layshaft 920. The one-way clutch 994, having a construction and operation similar to that described above with respect to the transmission mechanism 500 of FIGS. 14-16, selectively engages the first gear pinion 970 for rotation with the odd layshaft 920. A synchronizer 120 is located on the odd layshaft 920 and is positioned between the third gear pinion 974 and the fifth gear pinion 978. This synchronizer 120 can selectively engage one of the third gear and fifth gear pinions 974 and 978 for rotation with the odd layshaft 920.

A second gear pinion 972, a fourth gear pinion 976 and the reverse gear pinion 982 are located on the even layshaft 922. A synchronizer 120 is located on the even layshaft 922 and selectively can engage either the second gear pinion 972 or the fourth gear pinion 976 for selectively engaging one of these pinions 972 and 976 for rotation with the even layshaft 922. The reverse gear pinion 982, also located on the even layshaft 922, is associated with the planetary gear system 992.

The planetary gear system 992 includes a centrally-located sun gear 966, which is integrally formed with the even layshaft 922, one or more planet gears 996, which in turn is surrounded by a ring gear 964. When the ring gear 964 is engaged, such as by using a band, dog clutch or friction clutch (not shown), it is locked relative to a housing 998 of the transmission system 900. This in turn causes the sun gear 966 to rotate the planet gear 964, which is connected to the reverse gear pinion 982 for driving rotation. The reverse gear pinion 982 then drives a final drive gear 990 for rotation via the outer circumference thereof.

A countershaft 950 is orientated parallel to and spaced from the odd and even layshafts 920, 922. A first gear 952, second gear 954, third/fourth gear 956 and fifth gear 958 are mounted to the countershaft 950. The first gear 952 is aligned to be driven by the first gear pinion 970. The second gear 954 is aligned to be driven by the second gear pinion 972. The third/fourth gear 956 is aligned to be driven by either the third gear pinion 974, when the odd clutch system 960 is engaged to rotate the odd layshaft 920, or the fourth gear pinion 976, when the even clutch system 962 is engaged to rotate the even layshaft 922. The fifth gear 958 is aligned to be driven by either the fifth gear pinion 978, when the odd clutch system 960 is engaged to rotate the odd layshaft 920, or the inner circumference of the final idler gear 990, via the reverse gear pinion 982, when the even clutch system 962 is engaged to rotate the even layshaft 922 and the reverse gear pinion 982 is driven for rotation by the planetary gear system 992.

Each of the combinations of the gears 952, 954, 956 and 958 of the countershaft 950 and the gear pinions 970, 972, 974, 976, 978 and 982 have a different downstream gear ratio. The downstream gear ratio is multiplied by with the upstream sprocket ratio, between either the engine input sprocket and the odd clutch drive sprocket 942 for the odd gears or the input sprocket and the even clutch drive sprocket 944 for the even and reverse gears, to produce an effective gear ratio of the transmission mechanism 900.

While specific examples are described above, including presently preferred modes, those skilled in the art will appreciate that there are numerous variations, modifications, substitutions and permutations of the above-described systems and techniques that fall within the scope of the disclosure herein. For example, while the transmission mechanisms of FIGS. 1-3, 13 and 14-22 are described as having, on the upstream sides of their clutch systems, a chain-and-sprocket drive configuration, it will be understood that, depending upon the particular application parameters, any of the different input side configurations of FIGS. 4-12 could be substituted therefore.

What is claimed is:

1. An automotive transmission mechanism for transmitting torque from an engine input shaft of an engine to a drive train comprising:

an input shaft of the engine having an engine input member in simultaneous driving relation with a first clutch drive member and a second clutch drive member, the first clutch drive member configured to transfer torque from the engine input member to an input side of a first clutch at first gear ratio and the second clutch drive member configured to transfer torque from the engine input member to an input side of a second clutch at a second gear ratio, the second gear ratio different from the first gear ratio;

a first layshaft rotatable about a first layshaft axis and selectively engagable to be driven by the first clutch and to receive torque transferred from the engine input member at the first gear ratio;

a second layshaft rotatable about a second layshaft axis that is spaced from the first layshaft axis and selectively engagable to be driven by the second clutch and to receive torque transferred from the engine input member at the second gear ratio; and the first layshaft having a first set of a plurality of coaxial pinions, the second layshaft having a second set of a plurality of coaxial pinions;

a countershaft rotatable about a countershaft axis that is spaced from the first layshaft axis and the second layshaft axis, the countershaft having a first set of gears and a second set of gears mounted coaxially thereon, each gear from the first set of the gears in intermeshing, driven relation with a pinion from the first set of pinions with a gear ratio therebetween, and each gear from the second set of the gears in intermeshing, driven relation with a pinion from the second set of pinions with a gear ratio therebetween, the gear ratio of each pair of pinions and gears differing from the gear ratios of other pairs of pinions and gears; and each of the first set of pinions independently engagable with the first layshaft when the first clutch is engaged to transfer torque to the countershaft at an effective gear ratio that is a product of the gear ratio between the engaged pinion and the gear pair and the first gear ratio between the engine input member and the first clutch drive member, and each of the second set of pinions independently engagable with the second layshaft when the second clutch is engaged to transfer torque to the countershaft at an effective gear ratio that is a product of the gear ratio between the engaged pinion and gear pair and the second gear ratio between the engine input member and the second clutch drive member, each of the effective gear ratios provided thereby differing from the other effective gear ratios, wherein a first gear pinion of the first set of pinions is selectively engaged for rotation with first layshaft using a one way clutch, the one way clutch engaging the first gear pinion for rotation with the first layshaft when the first layshaft is rotating within a predetermined range of speeds and not engaging the first gear pinion for rotation with the first layshaft when the first layshaft is rotating at a speed exceeding the predetermined range of speeds.

2. An automotive transmission mechanism in accordance with claim 1, wherein:

a first layshaft synchronizer is mounted on the first layshaft and is adapted to selectively engage at least one of the first set of pinions with the first layshaft for rotation therewith; and a second layshaft synchronizer is mounted on the second layshaft and is adapted to selectively engage at least one of the second set of pinions with the second layshaft for rotation therewith.

3. An automotive transmission mechanism in accordance with claim 2, wherein:

a plurality of synchronizers are mounted on the first and second layshafts, one of a first set of the synchronizers adapted to selectively engage at least one of the first set of pinions or the second set of pinions with the respective one of the first or second layshafts for rotation therewith.

4. An automotive transmission mechanism in accordance with claim 2, wherein each of the synchronizers include a contact portion with a first friction surface and the pinions include a receiving portion with second friction surface, the synchronizers engaging the pinions by a progressive increase in frictional contact between the first and second friction surfaces, and the synchronizer contact portion comprises a single cone with an outer surface comprising the first friction surface.

5. An automotive transmission mechanism in accordance with claim 1, wherein the engine input member comprises a sprocket, the first clutch drive member comprises a sprocket and the second clutch drive member comprises a sprocket, the engine input sprocket simultaneously driving the first clutch drive sprocket and the second clutch drive sprocket with at least one endless chain, the engine input sprocket driving the first clutch drive sprocket, the first clutch drive sprocket and the second clutch drive sprocket provided with a predetermined number of sprocket teeth;

the number of sprocket teeth of the engine input sprocket and the first drive clutch sprocket selected to produce the first gear ratio therebetween, and the number of sprocket teeth of the engine input sprocket and the second drive clutch sprocket selected to produce the second gear ratio therebetween.

6. An automotive transmission mechanism in accordance with claim 1, wherein the engine input member comprises a first sprocket and a second sprocket, the first engine input sprocket driving the first clutch drive member with a first endless chain and the second engine input sprocket driving the second clutch drive member with a second endless chain, the number of sprocket teeth of the first engine input sprocket and the first drive clutch drive member selected to produce the first gear ratio therebetween, and the number of sprocket teeth of the second engine input sprocket and the second clutch drive member selected to produce the second gear ratio therebetween.

7. An automotive transmission mechanism in accordance with claim 1, wherein:

the engine input member, first clutch drive member and second clutch drive member comprise gears;

a first idler gear is engaged with and driven for rotation by the engine input gear, the first idler gear also being engaged with and driving for rotation the first clutch drive gear; and a second idler gear is engaged with and driven for rotation by the engine input gear, the second idler gear also being engaged with and driving for rotation the second clutch drive gear;

the engine input gear having a preselected diameter and the first clutch drive gear having a diameter selected to produce the first gear ratio therebetween, and the second clutch drive gear having a diameter selected to produce the second gear ratio between the second clutch drive gear and the engine input gear.

8. An automotive transmission mechanism in accordance with claim 1, wherein:

the engine input member comprises an engine input sprocket and an engine input gear, the first clutch drive member comprises a gear and the second clutch drive member comprises a sprocket;

a first idler gear is engaged with and driven for rotation by the engine input gear of the engine input member, the first idler gear also being engaged with and driving for rotation the first clutch drive gear; and the engine input sprocket of the engine input member drives the second clutch drive sprocket for rotation with an endless chain, the engine input gear having a preselected diameter and the first clutch drive gear having a diameter selected to produce the first gear ratio therebetween, and the engine input sprocket and the second clutch drive sprocket provided with a preselected number of teeth to produce the second gear ratio therebetween.

9. An automotive transmission mechanism in accordance with claim 1, wherein:

the engine input member, first clutch drive member and second clutch drive member comprise gears;

a first idler gear is engaged with and driven for rotation by the engine input member, the first idler gear also being engaged with and driving for rotation the first clutch drive gear; and a second idler gear is engaged with and driven for rotation by the first clutch drive gear, the second idler gear also being engaged with and driving for rotation the second clutch drive gear;

the engine input gear having a preselected diameter and the first clutch drive gear having a diameter selected to produce the first gear ratio therebetween, and the engine input gear, first drive clutch gear and the second clutch drive gear provided with diameters to produce the second gear ratio between the engine input gear and the second clutch drive gear.

10. An automotive transmission mechanism in accordance with claim 1, wherein:

the engine input member comprises a sprocket, the first clutch drive member comprises a first clutch drive gear and a first clutch drive sprocket, the first clutch drive gear and first clutch drive sprocket associated so that rotation of one will rotate the other, and the second clutch drive member comprises a gear;

the engine input sprocket driving the first clutch drive sprocket for rotation with an endless chain;

a first idler gear engaged with and driven for rotation by the first clutch drive gear, the first idler gear also engaged with and driving for rotation the second clutch drive gear;

the engine input sprocket and the first clutch drive sprocket provided with a preselected number of teeth to produce the first gear ratio therebetween, and the first clutch drive gear and the second clutch drive gear having preselected diameters selected to produce the second gear ratio between the engine input sprocket and the second clutch drive gear.

11. An automotive transmission in accordance with claim 1, wherein the first layshaft has a reverse pinion independently engageable with the first layshaft, the reverse pinion being intermeshed with a reverse idler gear and the reverse idler gear being intermeshed with a reverse gear mounted on the countershaft and in driving relation therewith when the first clutch is engaged to transfer torque to the countershaft at an effective gear ratio that is a product of the ratio between the reverse pinion and the reverse gear and the first gear ratio between the engine input member and the first clutch drive member, and the reverse gear rotation is in the same direction as the rotational direction of the first layshaft.

12. An automotive transmission in accordance with claim 1, wherein:
a reverse pinion is mounted on the second layshaft;
a reverse idler gear is intermeshed with the reverse pinion;
a first position of the reverse idler gear where the reverse idler gear is intermeshed with a reverse gear mounted on the countershaft to drive the reverse gear when the first clutch is engaged to transfer torque to the countershaft at an effective gear ratio that is a product of the ratio between the reverse pinion and the reverse gear and the first gear ratio between the engine input member and the first clutch drive member, and the reverse gear rotates in the same direction as the rotational direction of the first layshaft;
a second position of the reverse idler gear where the reverse idler gear is not intermeshed with the reverse gear; and
means for shifting the reverse idler gear between the first position and the second position.

13. An automotive transmission in accordance with claim 1, wherein the second layshaft has a reverse pinion independently engageable via a planetary gear system to be driven for rotation by the first layshaft and in an opposite direction of rotation thereto, the reverse pinion being intermeshed with a reverse gear mounted on the countershaft and in driving relation therewith when the planetary gear system is engaged to transfer torque to the countershaft at an effective gear ratio that is a product of the ratio between the reverse pinion and the reverse gear and the first gear ratio between the engine input member and the first clutch drive member.

14. An automotive transmission in accordance with claim 1, wherein:
each of the pinions of the first set of pinions and each of the pinions of the second set of pinions has a diameter (Dp);
each of the gears of the first set of gears and each of the gears of the second set of gears has a diameter (Dg);
the diameter of the pinion of the first and second set of pinions is the smallest (Dp') and the diameter of the first and second sets of gears (Dg') have the following relationship: $(Dg')*2/5 </= Dp'$.

15. An automotive transmission in accordance with claim 1, wherein the countershaft includes a common gear that is one of the first set of gears and one of the second set of gears, the common gear being configured to be driven by both one of the first set of pinions or one of the second set of pinions when one or the other of the first or second clutches is engaged.

16. An automotive transmission in accordance with claim 15, wherein the countershaft includes more than one common gear.

17. An automotive transmission in accordance with claim 1, wherein:
the first set of pinions of the first layshaft comprises a first pinion, a third pinion and a fifth pinion, at least two of the first, third and fifth pinions being engageable with the first layshaft using one or more synchronizers mounted on the first layshaft;
the second set of pinions of the second layshaft comprises a second pinion and a fourth pinion, the second and fourth pinions being engageable with the second layshaft using one or more synchronizers mounted on the second layshaft;
the first set of gears of the countershaft comprises a first gear intermeshed with the first pinion, a third gear intermeshed with the third pinion, and a fifth gear intermeshed with the fifth pinion; and
the second set of gears of the countershaft comprises a second gear intermeshed with the second pinion and a fourth gear intermeshed with the fourth pinion, the fourth gear being the same as the third gear.

18. An automotive transmission in accordance with claim 17, wherein:
the second set of pinions of the second layshaft includes a sixth pinion;
the second set of gears of the countershaft includes a sixth gear intermeshed with the sixth pinion, the sixth gear being the same as the fifth gear and being engageable with the countershaft using a synchronizer mounted on the countershaft.

19. An automotive transmission in accordance with claim 1, wherein:
the first set of pinions of the first layshaft comprises a first pinion, a third pinion and a fifth pinion, at least two of the first, third and fifth pinions being engageable with the first layshaft using one or more synchronizers mounted on the first layshaft;
the second set of pinions of the second layshaft comprises a second pinion and a fourth pinion, the second and fourth pinions being engageable with the second layshaft using one or more synchronizers mounted on the second layshaft;
the first set of gears of the countershaft comprises a first gear intermeshed with the first pinion, a third gear intermeshed with the third pinion, and a fifth gear intermeshed with the fifth pinion; and
the second set of gears of the countershaft includes a second gear intermeshed with the second pinion and a fourth gear intermeshed with the fourth pinion, the second gear being the same as the third gear.

20. An automotive transmission in accordance with claim 19, wherein the fourth gear is the same as the fifth gear.

21. A method of modifying torque using a dual clutch transmission mechanism, the method comprising:
driving an input member at an input torque;
driving a first drive member at a first torque via the input member, the first torque being determined by a first ratio between the input member and the first drive member, the first torque being different than the input torque but in the same rotational direction;
driving a second input member at a second torque via the input member, the second torque being determined by a second ratio between the input member and the second drive input member, the second torque being different than the first torque and the input torque but being in the same rotational direction;

driving a first clutch at the first torque via the first drive member;

driving a second clutch at the second torque via the second drive input member;

driving a first layshaft at the first torque when the first clutch is engaged, the first layshaft having a plurality of first pinions each independently and selectively engageable with the first layshaft to be driven for rotation at the first torque;

driving a second layshaft at the second torque when the second clutch is engaged, the second layshaft having a plurality of second pinions each independently and selectively engageable with the second layshaft to be drive for rotation at the second torque;

engaging one of the pinions of the first layshaft for rotation with the first layshaft when the first clutch is engaged;

engaging one of the pinions of the second layshaft for rotation with the second layshaft when the second clutch is engaged;

driving a countershaft for rotation at a countershaft torque, the countershaft having a plurality of gears mounted thereon, each of the gears being intermeshed with one or more of the first pinions and one or more of the second pinions to be driven for rotation thereby at the countershaft torque when the one or more of the first and second pinions are engaged with the respective one of the first and second layshafts and the respective one of the first and second clutches is engaged, a gear/pinion ratio between each of the plurality of gears of the countershaft and the intermeshed one of the one or more of the first and second pinions, the countershaft torque being modified by the product of the first ratio and the selected gear/pinion ratio when the first clutch is engaged and the second ratio and the selected gear/pinion ratio when the second clutch is engaged, wherein a first gear pinion of the first plurality of pinions is selectively engaged for rotation with first layshaft using a one way clutch, the one way clutch engaging the first gear pinion for rotation with the first layshaft when the first layshaft is rotating within a predetermined range of speeds and not engaging the first gear pinion for rotation with the first layshaft when the first layshaft is rotating at a speed exceeding the predetermined range of speeds.

22. A method of modifying torque in accordance with claim 21, wherein:

the step of engaging one of the pinions of the first layshaft for rotation with the first layshaft when the first clutch is engaged includes the step of actuating a first synchronizer mounted on the first layshaft to drive the one of the pinions of the first layshaft for rotation with the first layshaft; and the step of engaging one of the pinions of the second layshaft for rotation with the second layshaft when the second clutch is engaged includes the step of actuating a second synchronizer mounted on the second layshaft to drive the one of the pinions of the second layshaft for rotation with the second layshaft.

23. A method of modifying torque in accordance with claim 22, wherein one of the gears of the countershaft is shared by one of the pinions of the first layshaft and one of the pinions of the second layshaft.

24. A method of modifying torque in accordance with claim 21, wherein the steps of driving a first clutch at the first torque via the first drive member and driving a second clutch at the second torque via the second drive input member include the step of transmitting the input torque from the input member to the first drive member at the first torque and the second drive input member at the second torque using one or more chains.

25. A method of modifying torque in accordance with claim 21, wherein the steps of driving a first clutch at the first torque via the first drive member and driving a second clutch at the second torque via the second drive input member include the step of transmitting the input torque from the input member to the first drive member at the first torque and the second drive input member at the second torque using one or more gears disposed between the input member and one or more of the first drive member and the second drive member.

26. A dual clutch transmission comprising:

an input shaft;

an odd shaft carrying a plurality of odd gear pinions including a first gear pinion rotatable with respect to the odd shaft and connectable to the odd shaft by a one-way clutch;

an odd clutch coupled between the input shaft and the odd shaft according to an odd gear ratio;

an even shaft parallel and spaced apart with respect to the odd shaft and carrying a plurality of even gear pinions;

an even clutch coupled between the input shaft and the even shaft according to an even gear ratio; and an output shaft parallel and spaced apart with respect to the odd and even shafts and carrying a first plurality of output gears in mesh with the odd gear pinions to provide a plurality of odd gear ratios, and a second plurality of output gears in mesh with the even gear pinions to provide a plurality of even gear ratios.

27. The transmission of claim 26 wherein the plurality of odd gear pinions also includes third and fifth gear pinions rotatable with respect to the odd shaft and selectively connectable thereto with a first common synchronizer therebetween.

28. The transmission of claim 27, wherein the plurality of even gear pinions includes second and fourth gear pinions selectively connectable to the even shaft with a second common synchronizer therebetween, and the even shaft also carries a reverse gear pinion selectively connectable thereto with a third synchronizer, such that the transmission includes only three synchronizers for first through fifth and reverse gears.

29. The transmission of claim 27 further comprising a second common synchronizer to selectively connect two of the plurality of even pinions to the even shaft, such that the transmission includes only two synchronizers for first through fifth gears.

30. The transmission of claim 29, wherein the synchronizers are of the same type and have the same torque capacity.

31. The transmission of claim 29, wherein the two pinions include second and fourth gear pinions.

32. The transmission of claim 26, wherein the pluralities of output gears include a common gear engaged with a second gear pinion of the plurality of even gear pinions and with a third gear pinion of the plurality of odd gear pinions and with a reverse idler gear.

33. The transmission of claim 26 further comprising a reverse planetary gear system including a sun gear on the even shaft, a lockable ring gear, and planet gears coupled between the sun gear and the ring gear, and a reverse gear pinion carried on the even shaft and coupled to the planet gears, and wherein the plurality of odd gear pinions also includes third and fifth gear pinions rotatable with respect to the odd shaft and selectively connectable thereto with a first common synchronizer therebetween, and wherein the plurality of even gear pinions includes second and fourth gear pinions selectively connectable to the even shaft with a second common synchronizer therebetween, such that the transmission includes only two synchronizers for first through fifth and reverse gears.

34. The transmission of claim 33 wherein the pluralities of output gears include a common gear engaged with a fifth gear pinion of the plurality of odd gear pinions, and a final drive gear that is also engaged to the reverse gear pinion.

35. The transmission of claim 26 further comprising a reverse gear idler shaft and a reverse gear idler carried on the reverse gear idler shaft, wherein the even shaft also carries a reverse gear pinion and the reverse gear idler is selectively slidable along the reverse gear pinion.

36. The transmission of claim 26 wherein the plurality of odd gear pinions also includes third and fifth gear pinions rotatable with respect to the odd shaft and selectively connectable thereto with a first common synchronizer therebetween, and wherein the plurality of even gear pinions includes a second gear selectively connectable to the even shaft with a second gear synchronizer and fourth and sixth gear pinions selectively connectable to the even shaft with a second common synchronizer therebetween, such that the transmission includes only three synchronizers for first through sixth and reverse gears.

37. The transmission of claim 36 further comprising a reverse gear idler shaft and a reverse gear idler carried on the reverse gear idler shaft, wherein the even shaft also carries a reverse gear pinion and the reverse gear idler is selectively slidable along the reverse gear pinion.

38. A dual clutch transmission comprising:
an input shaft;
an odd shaft carrying a plurality of odd gear pinions including a first gear pinion and a reverse gear pinion rotatable with respect to the odd shaft and connectable thereto by a first common synchronizer, and a third gear pinion and a fifth gear pinion rotatable with respect to the odd shaft and connectable thereto by a second common synchronizer, wherein the first and second common synchronizers are of the same type and have the same torque capacity;
an odd clutch coupled between the input shaft and the odd shaft according to an odd gear ratio;
an even shaft parallel and spaced apart with respect to the odd shaft and carrying a plurality of even gear pinions including a second gear and a fourth gear rotatable with respect to the even shaft and selectively connectable thereto by third and fourth synchronizers that are of the same type and have the same torque capacity;
an even clutch coupled between the input shaft and the even shaft according to an even gear ratio; and
an output shaft parallel and spaced apart with respect to the odd and even shafts and carrying a first plurality of output gears in mesh with the odd gear pinions to provide a plurality of odd gear ratios, and a second plurality of output gears in mesh with the even gear pinions to provide a plurality of even gear ratios.

39. The transmission of claim 38 wherein the first plurality of output gears are all different than the second plurality of output gears.

40. A dual clutch transmission comprising:
an input shaft;
an odd shaft carrying a plurality of odd gear pinions all rotatable with respect to the odd shaft and at least one of which is selectively connectable to the odd shaft by a first synchronizer;
an odd clutch coupled between the input shaft and the odd shaft according to an odd gear ratio;
an even shaft parallel and spaced apart with respect to the odd shaft and carrying a plurality of even gear pinions all rotatable with respect to the even shaft and at least one of which is selectively connectable to the even shaft by a second synchronizer;
an even clutch coupled between the input shaft and the even shaft according to an even gear ratio; and
an output shaft parallel and spaced apart with respect to the odd and even shafts and carrying a first plurality of output gears in mesh with the odd gear pinions to provide a plurality of odd gear ratios, and a second plurality of output gears in mesh with the even gear pinions to provide a plurality of even gear ratios,
wherein the clutches are simultaneously partially engageable to provide a blended gear ratio between the odd and even shafts.

41. A dual clutch transmission comprising:
an input shaft;
an odd shaft carrying a plurality of odd gear pinions all rotatable with respect to the odd shaft and including third and fifth gear pinions rotatable with respect to the odd shaft and selectively connectable thereto with a first common synchronizer therebetween;
an odd clutch coupled between the input shaft and the odd shaft according to an odd gear ratio;
an even shaft parallel and spaced apart with respect to the odd shaft and carrying a plurality of even gear pinions all rotatable with respect to the even shaft and at least one of which is selectively connectable to the even shaft by a second synchronizer;
an even clutch coupled between the input shaft and the even shaft according to an even gear ratio; and
an output shaft parallel and spaced apart with respect to the odd and even shafts and carrying a first plurality of output gears in mesh with the odd gear pinions to provide a plurality of odd gear ratios, and a second plurality of output gears in mesh with the even gear pinions to provide a plurality of even gear ratios, wherein the pluralities of output gears include a common gear engaged with the fifth gear pinion of the plurality of odd gear pinions and at least one of a fourth gear pinion or a sixth gear pinion of the plurality of even gear pinions and wherein the synchronizers are of the same type and have the same torque capacity.

42. The transmission of claim 41, wherein the pluralities of output gears include a second common gear engaged with a second gear pinion of the plurality of even gear pinions and with the third gear pinion of the plurality of odd gear pinions.

43. The transmission of claim 41 wherein the input shaft is coupled to the clutches in series.

44. The transmission of claim 41 wherein the clutches are partially engageable to produce a blended gear ratio between the odd and even shafts.

45. A dual clutch transmission comprising:
an input shaft;
an odd shaft carrying a plurality of odd gear pinions all rotatable with respect to the odd shaft;
an odd clutch coupled between the input shaft and the odd shaft according to an odd gear ratio;
an even shaft parallel and spaced apart with respect to the odd shaft and carrying a plurality of even gear pinions all rotatable with respect to the even shaft;
an even clutch coupled between the input shaft and the even shaft according to an even gear ratio; and an output shaft parallel and spaced apart with respect to the odd and even shafts and carrying a first plurality of output gears in mesh with the odd gear pinions to provide a plurality of odd gear ratios, and a second plurality of output gears in mesh with the even gear pinions to provide a plurality of even gear ratios, wherein the pluralities of output gears include a common gear engaged with a fifth gear pinion of the plurality of odd gear pinions, and at least one of a fourth gear pinion or a sixth gear pinion of the plurality of even gear pinions, and with a final drive gear.

46. A dual clutch transmission comprising:

an input shaft;

an odd shaft carrying a plurality of odd gear pinions;

an odd clutch coupled between the input shaft and the odd shaft according to an odd gear ratio;

an even shaft parallel and spaced apart with respect to the odd shaft and carrying a plurality of even gear pinions;

an even clutch coupled between the input shaft and the even shaft according to an even gear ratio; and an output shaft parallel and spaced apart with respect to the odd and even shafts and carrying a first plurality of output gears in mesh with the odd gear pinions to provide a plurality of odd gear ratios, and a second plurality of output gears in mesh with the even gear pinions to provide a plurality of even gear ratios, wherein the clutches have the same size and capacity and use interchangeable components, and the input shaft is coupled to the clutches by at least one of an idler gear or a chain disposed between at least one of gears or sprockets coupled to the input shaft and clutches.

47. The transmission of claim 46, wherein the input shaft is coupled to the clutches in parallel by a pair of idler gears.

48. The transmission of claim 46, wherein the input shaft is coupled in parallel to one of the clutches with an idler gear and to the other of the clutches by a chain.

49. The transmission of claim 46, wherein the input shaft is coupled to the clutches in parallel with a pair of chains.

50. The transmission of claim 46, wherein the input shaft is coupled to the clutches in series with a pair of idler gears.

51. The transmission of claim 46, wherein the input shaft is coupled to the clutches in series with a chain and an idler gear.

52. The transmission of claim 46 wherein the first plurality of output gears are all different than the second plurality of output gears.

* * * * *